United States Patent
Ackermann et al.

(10) Patent No.: US 11,692,077 B2
(45) Date of Patent: Jul. 4, 2023

(54) POLYMER COMPOSITION CONTAINING A PHOSPHONATE FLAME RETARDANT

(71) Applicant: Chemische Fabrik Budenheim KG, Budenheim (DE)

(72) Inventors: Niklas Ackermann, Mainz-Kostheim (DE); Birgit Faßbender, Mainz (DE); Thomas Futterer, Ingelheim (DE); Christoph Ramsey, Ingelheim (DE); Herbert Weiss, Vaihingen an der Enz (DE); Hendrik Wermter, Eltville (DE)

(73) Assignee: Chemische Fabrik Budenheim KG, Budenheim (DE)

(*) Notice: Subject to any disclaimer, the term of this patent is extended or adjusted under 35 U.S.C. 154(b) by 0 days.

(21) Appl. No.: 17/268,108

(22) PCT Filed: Aug. 12, 2019

(86) PCT No.: PCT/EP2019/071616
§ 371 (c)(1),
(2) Date: Feb. 12, 2021

(87) PCT Pub. No.: WO2020/035458
PCT Pub. Date: Feb. 20, 2020

(65) Prior Publication Data
US 2021/0309831 A1    Oct. 7, 2021

(30) Foreign Application Priority Data
Aug. 15, 2018   (DE) .................... 10 2018 119 835.3

(51) Int. Cl.
*C08K 5/5357* (2006.01)
*C08J 9/14* (2006.01)
(Continued)

(52) U.S. Cl.
CPC ............ *C08K 5/5357* (2013.01); *C08G 18/00* (2013.01); *C08G 63/00* (2013.01); *C08J 9/141* (2013.01);
(Continued)

(58) Field of Classification Search
CPC .. C08K 5/5357; C08K 5/5353; C08K 5/0066; C08J 9/141; C08L 67/00; C08L 75/04; C08G 18/00; C08G 63/00
See application file for complete search history.

(56) References Cited

U.S. PATENT DOCUMENTS 4,216,163 A    8/1980  Sommer et al.
4,873,180 A   10/1989  Marchesano et al.
(Continued)

FOREIGN PATENT DOCUMENTS

CA    2 027 078 A1    4/1991
CA    2092775 A1 *   3/1993  ............... C07F 9/40
(Continued)

OTHER PUBLICATIONS

Liu, Chuanchuan et al., "Design and Synthesis of Efficient Phosphorus Flame Retardant for Polycarbonate," Indsutrial & Engineering Chemistry Research, 2017, vol. 56, No. 31, pp. 8789-8796.
(Continued)

*Primary Examiner* — John E Uselding
(74) *Attorney, Agent, or Firm* — Faegre Drinker Biddle & Reath LLP

(57) ABSTRACT

A composition containing a polymer material and a phosphorus-containing flame retardant based on an aminomethyl bisphosphonate, a process for the production of the composition, and the use of the flame retardant as well as selected structures of the flame retardant are disclosed.

14 Claims, 7 Drawing Sheets

(51) Int. Cl.
    *C08K 5/5353*     (2006.01)
    *C08L 67/00*     (2006.01)
    *C08L 75/04*     (2006.01)
    *C08G 18/00*     (2006.01)
    *C08G 63/00*     (2006.01)
    *C08K 5/00*     (2006.01)

(52) U.S. Cl.
    CPC .......... *C08K 5/0066* (2013.01); *C08K 5/5353* (2013.01); *C08L 67/00* (2013.01); *C08L 75/04* (2013.01); *C08J 2375/04* (2013.01)

(56) References Cited

U.S. PATENT DOCUMENTS

| | | |
|---|---|---|
| 5,276,066 A | 1/1994 | Paulik et al. |
| 5,844,028 A | 12/1998 | Paulik |
| 2013/0319618 A1* | 12/2013 | Kernbaum ................ B01J 8/00 252/60 |
| 2016/0264394 A1 | 9/2016 | Hershberger et al. |
| 2017/0314981 A1 | 11/2017 | Flockenhaus et al. |

FOREIGN PATENT DOCUMENTS

| | | |
|---|---|---|
| DE | 2 128 060 A1 | 12/1972 |
| DE | 31 33 308 A1 | 3/1983 |
| DE | 38 83 995 T2 | 3/1994 |
| DE | 10 2007 026 243 A1 | 12/2008 |
| EP | 0 001 996 A1 | 5/1979 |
| EP | 0563730 A2 | 10/1993 |
| JP | 50-095227 A | 7/1975 |
| JP | 54-037829 A | 3/1979 |
| JP | 54-095648 A | 7/1979 |
| JP | 54-135724 A | 10/1979 |
| JP | 06-049082 A | 2/1994 |
| JP | 2016-030798 A | 3/2016 |
| WO | WO-2014/124933 A2 | 8/2014 |
| WO | WO-2017083468 A1 * | 5/2017 ............ C07F 9/6568 |

OTHER PUBLICATIONS

Office Action issued in Indian patent application No. 20147009748, dated Jun. 30, 2022 (in English).

Schulke et al., "Zur Darstellung von Cyclophosphaten, Cyclophosphatophosphonaten, Diphosphonaten und Diphosphiten in Hamstoffschmelzen", Journal of Inorganic and General Chemistry, Sep. 1989, pp. 272-280.

\* cited by examiner

POLYMER COMPOSITION CONTAINING A PHOSPHONATE FLAME RETARDANT

CROSS REFERENCE TO RELATED APPLICATIONS

This application is a National Stage of International Application No. PCT/EP2019/071616 filed Aug. 12, 2019, which claims benefit of German Patent Application No. 10 2018 119 835.3 filed Aug. 15, 2018, both of which are herein incorporated by reference in their entirety.

FELD OF THE INVENTION

The invention relates to a composition containing a polymer material and a phosphorus-containing flame retardant based on an aminomethyl bisphosphonate, to a process for the production of the composition, to the use of the flame retardant as well as to selected structures of the flame retardant.

BACKGROUND OF THE INVENTION

Numerous substances are known for providing polymer materials with flame retardant properties; they may be used alone or in combination with other substances which provide similar or supple-mental flame retardant properties. Halogenated organic compounds, metal hydroxides, organic or inorganic phosphates, phosphonates or phosphinates as well as derivatives of 1,3,5-triazine compounds and mixtures thereof are among the most well-known flame retardants. These flame retardants can be differentiated into low molecular weight and high molecular weight substances. Although high molecular weight substances, i.e. polymeric flame retardants such as the halogenated polyol Exolit OP 550 from Clariant, advantageously have only negligible plasticizing effects and low migration capacity in the polymer material, in contrast to the low molecular weight flame retardant additives, they are often more difficult to mix with the polymer material to be protected during technical processing, in particular when they have low melting capabilities. Furthermore, curing of the polymer material may be compromised when high molecular weight flame retardants are added.

The majority of flame retardants used are therefore low molecular weight compounds, in this area, phosphorus-containing compounds, inter alia, have proved to be particularly efficient. In polymer materials, in the event of fire, these can expand into voluminous protective layers, which is termed intumescence. In this, an isolating layer which inhibits the supply of oxygen is formed, which prevents the polymer material from burning further. Furthermore, the flame retarding action in the solid phase may originate from an increase in the amount of carbonization of the polymer material or to the formation of inorganic glasses. A gas phase mechanism also contributes to the flame retarding activity, in which the burning process of the polymer material is slowed down substantially by radical combination with PO radicals which arise from combustion of the phosphorus compound. The most important phosphorus-containing compounds are the halogenated phosphates tris(2-chloroethyl)phosphate (TCEP) and tris(2-chloroisopropyl)phosphate (TCPP). However, their use is being restricted more and more because of the potential toxicity and ecological problems associated with their use, in particular because phosphates of this type are subject to bioaccumulation, but municipal sewage treatment plants can only remove them from wastewater with difficulty. Furthermore, they contain halogens which, in the event of fire, lead to the production and release of HX gases and other toxic compounds. Particularly in the field of electronics, corrosive combustion gases of this type constitute a major risk.

An alternative to phosphate-containing flame retardants are halogenated and halogen-free phosphonates. Compared with phosphates, these exhibit a particularly pronounced flame retarding gas phase activity. DE 2 128 080 describes the use of aminomethane phospbonic acid esters with a phosphorus content of up to 23.2% by weight as a flame retardant in polyurethanes. The aminomethane phosphonic acid esters are produced from hexamethylene tetramine and dialkyl or diaryl phosphonates. To use these phosphonates, they are dissolved together with other optionally required additives in the polyol component of a polyurethane-forming mixture and a polyisocyanate is added to if. The esters, containing NH groups, are incorporated into the polymer material by an addition to the isocyanate group.

EP 0 001 998 concerns the production of N,N-bis-(2-hydroxylalkyl)aminomethane phosphonic acid dimethylester, which are primarily used as flame retarding additives in polymer materials, in particular in polyurethane. To synthesize them, a mixture of dimethylphosphite and oxazolidine is added to an H-acid compound as a catalyst. The products have a terminal secondary hydroxy group and thus, when added to the polyol component of a polyurethane-forming mixture, can be incorporated into the polymer material. The added H-acid substances then remain in the polymer material, which could result in the properties being compromised. Alternatively, before being added to the polyol components, they have to be transformed into their corresponding alkali salts in order to be able to separate them from the phosphonic acid esters.

CA 2 027 078 concerns aminomethane phosphonic acid arylesters which can be used as flame retardants in foams, thermoplastics and duroplastics. The corresponding compounds are produced by reaction of an amine with trialkyl or triarylphosphites and paraformaldehyde. The products can either be added to the polymer material to be processed in the extrusion process, or as an additive of the co-condensation components in a polycondensation reaction.

Liu et at, *Ind. Eng. Chem. Res.* (2017), 56, 8789-8696 discloses DOPO derivatives with a flame retardant action which are produced from DOPO (9.10-dihydro-9-oxa-10-phosphaphenanthrene-10-oxide), paraformaldehyde and piperazine. They are halogen-free and have a flame retarding action when used in polycarbonates. However, these compounds as well, as in the documents mentioned above, exhibit only a low thermal stability, due to the weak P—C bond of the P—$CH_2$N group. Although the P—C bond is fundamentally stable chemically and thermally, the α-amino group stabilizes the carbon radical which is produced by the homolysis, so that cleavage of the P—C bond in these flame retardants occurs even at relatively low temperatures. Because the tertiary amine which is formed by the homolysis has a low molar mass, it escapes as a volatile component and brings about a corresponding loss of mass. If the flame retardant is embedded in a polymer material, more fumes may be formed due to the release of the amine. Because of the low decomposition temperature, the flame retardant is partially decomposed even during the process for moulding the polymer material into which if has been incorporated. A further disadvantage of these flame retardants is that, because of their low phosphorus content, they have to be added in high concentrations to the polymer material, whereupon processability, flexibility and other product properties of the polymer material are severely compromised.

AIM

In the light of this background, then, the present invention aims to provide a composition with a polymer material which has a halogen-free flame retardant with similar or even better flame retardant properties than the materials known from the prior art, which can be used in smaller concentrations in the composition, simultaneously with a good flame retarding action, which only decomposes at higher temperatures than known flame retardants, preferably far above the processing and/or production temperature and just below or at the decomposition temperature of the polymer material, and said decomposition leads to a lower fume density and/or a lower fume toxicity in the polymer material.

DESCRIPTION OF THE INVENTION

This aim is achieved in accordance with the invention by means of a composition which comprises a polymer material, in particular a thermoplastic or duroplastic polymer material, and with a halo-gen-free flame retardant contained and/or bonded therein in a quantity of 1 to 40% by weight with respect to the total composition, wherein the flame retardant is a compound with formula (I), its corresponding ammonium salt, its corresponding phosphonate salt or a mixture of the above:

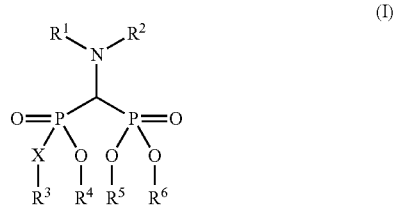

(I)

wherein
(i) $R^1$ and $R^2$ are identical or different substituents and are selected from the group consisting of linear, branched or cyclic alkyls, alkenyls and alkinyls, unsubstituted and alkyl-substituted phenyls, mononuclear and multinuclear aromatics containing up to 4 nuclei, mononuclear or multinuclear heteroaromatics containing up to 4 nuclei, silyls, allyl, alkyl or aryl alcohols, or
(ii) $R^1$ and $R^2$ together, including the N atom, form a saturated or monounsaturated or multiple-unsaturated heterocycle containing 4-8 ring atoms which are selected from carbon, oxygen, sulphur, phosphorus, silicon and nitrogen, wherein on the hetero-cycle, when it comprises nitrogen atoms as the ring atoms, these nitrogen atoms are substituted with H, an alkyl, an aryl or a methyl bisphosphonate group with the following structure (II):

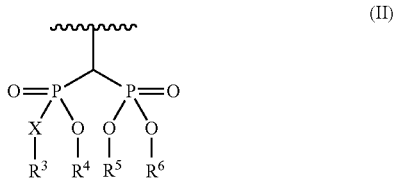

(II)

and wherein on the heterocycle, when it comprises carbon, phosphorus or silicon as the ring atoms, these atoms may have substituents selected from the group consisting of H, alkyl, aryl, —NH$_2$, —NHR, —NR$_2$, —OH, —OR, =O, —I, —Cl, —Br, in which R=alkyl, aryl,
and wherein □X□ is an oxygen atom, □O□ or □X□ is a single bond, and
wherein
(i) $R^3$, $R^4$, $R^5$ and $R^8$ are identical or different substituents and are selected from the group consisting of H, linear, branched or cyclic alkyls, alkenyls and alkinyls, unsubstituted and alkyl-substituted phenyls, multinuclear aromatics containing up to 4 nuclei, mononuclear or multinuclear heteroaromatics containing up to 4 nuclei, silyls, allyl, alkyl or aryl alcohols, cations, wherein the cation is Na$^+$, K$^+$, Mg$^{2+}$, Ca$^{2+}$, B$^{3+}$, Al$^{3+}$, Zn$^{2+}$, NH$_4^+$ or the ammonium ion of an amine compound selected from the group consisting of melamine or its condensation products, preferably melam, melem, melon, urea, guanidine, morpholine and piperazine, wherein
(ia) when $R^1$ and $R^2$ are equal to methyl, $R^3$, $R^4$, $R^5$ and $R^6$ are identical or different substituents and are selected from the group consisting of linear, branched or cyclic alkyls, alkenyls and alkinyls, unsubstituted and alkyl-substituted phenyls, multinuclear aromatics containing up to 4 nuclei, mononuclear or multinuclear heteroaromatics containing up to 4 nuclei, silyls, allyl, alkyl or aryl alcohols, cations, wherein the cation is Mg$^{2+}$, Ca$^{2+}$, B$^{3+}$, Al$^{3+}$, Zn$^{2+}$, or the ammonium ion of an amine compound selected from the group consisting of melamine or its condensation products, preferably melam, melem, melon, urea, guanidine, morpholine and piperazine, and/or
(ii) when □X□ is an oxygen atom, □O□, —OR$^3$ and —OR$^4$ together and/or □OR$^5$ and □OR$^6$ together, including the P atom of the phosphonate group, form a cyclic phosphonic acid ester with a ring size of 4-10 atoms, and/or
(iii) when □X□ is a single bond, $R^3$ and —OR$^4$ together, including the P atom of the phosphinate group, form a cyclic phosphinic acid ester with a ring size of 4-10 atoms and/or □OR$^5$ and □OR$^8$ together, including the P atom of the phosphonate group, form a cyclic phosphonic acid ester with a ring size of 4-10 atoms.

The flame retardant in accordance with the invention may be produced using the process described in DE 31 33 308 A1. In accordance with this process, alkylaminomethane diphosphonic acids or their acrylic derivatives can be obtained in very good yields when the reaction products from acetic anhydride or acetyl chloride and phosphoric acid are reacted with alkyl formamides in stoichiometric proportions, in order to obtain as high a yield as possible, the reaction temperature of the first reaction step, i.e. the reaction of acetic anhydride or acetyl chloride and phosphoric acid, is carried out between 40° C. and 80° C. Instead of the educts acetic anhydride or acetyl chloride with phosphoric acid, in the first reaction step, a mixture of phosphorous trichloride and acetic acid may also be used. Monoalkyl as well as dialkyl formamides such as, for example, methyl and dimethyl formamide, ethyl and diethyl formamide as well as formyl compounds of morpholine, piperidine, pyrolidine, oxazolidine, and alkanolamines, may be described as suitable alkyl formamides.

In a preferred embodiment, $R^1$ and $R^2$ together, including the N atom, form a morpholine or piperidine ring, particularly preferably structures with formulae (II) and (III):

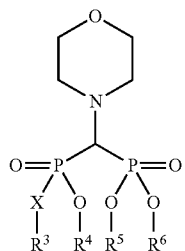

(II)

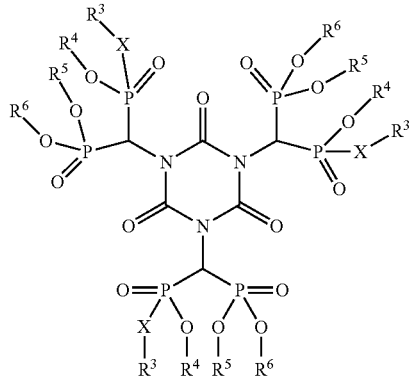

(V)

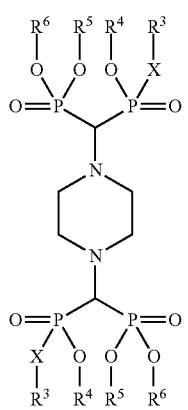

(III)

Preferably, in these structures X=—O— and $R^3$, $R^4$, $R^5$ and $R^6$ are H, $Na^+$, $NH_4^+$, $Zn^{2+}$ or $Al^{3+}$. In a particularly preferred embodiment, all of the groups $R^3$, $R^4$, $R^5$ and $R^6$ are H. In a further embodiment, three of the groups $R^3$, $R^4$, $R^5$ and $R^6$ are sodium and one group is H.

In a further embodiment, $R^1$ and $R^2$ together, including the N atom, form a 1,3,5-triazine cyclohexane ring, particularly preferably a structure with formula (IV):

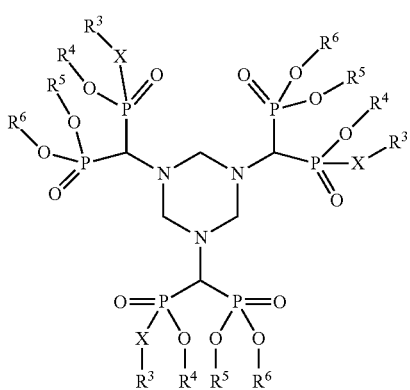

(IV)

In a further preferred embodiment, $R^1$ and $R^2$ together, including the N atom, form a 1,3,5-triazine-2,4,6-tricyclohexane ring, particularly preferably a structure with formula (V):

In a further preferred embodiment, $R^1$ and $R^2$ are identical or different substituents, wherein at least one of the substituents is melamine, wherein the nitrogen atoms of the amino groups are substituted with H, an alkyl, an aryl or a methyl bisphosphonate group with the following structure (II):

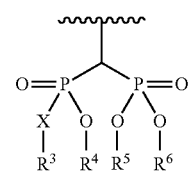

(II)

Particularly preferably, one of the substituents on each of the nitrogen atoms of the amino groups is H and the other is a methyl bisphosphonate group with structure (II). In another preferred embodiment, both substituents on each of the nitrogen atoms are a methyl bisphosphonate group with structure (II).

The flame retardants in accordance with the invention have a higher thermal stability than the known phosphonates from the prior art, in which the carbon in the position α to the nitrogen is only substituted with one phosphonate group. This means that the decomposition temperature is higher than with comparable known phosphonates. In the context of the invention, the ☐decomposition temperature☐ should be understood to mean the temperature at which the loss of mass of a dry sample of the flame retardant reaches 2% by weight. As an example, aminotrimethylene phosphonic acid (ATMP, CAS: 6419-19-8) has already reached a loss of mass of 2% by weight at 176.4° C. (see FIG. 5). A corresponding loss of mass is only obtained with the phosphonates in accordance with the invention at significantly higher temperatures (see FIGS. 2 and 4). The loss of mass of the sample as a function of temperature can be determined by thermogravimetric analysis, in this case, dry means that the water content of the flame retardant is <0.5% by weight. The water content of the flame retardant may be determined using methods which are familiar to the person skilled in the art such as, for example, colorimetric Karl Fischer titration or NIR spectroscopy. The flame retardant in accordance with the invention is particularly suitable for incorporation into a polymer material which is to be processed by extrusion, because it does not decompose at the processing temperatures usually employed for extrusion, but only at the higher temperatures encountered during fires, and then it deploys its flame retardant action.

In addition, the flame retardant in accordance with the invention also advantageously has a low fumes development. This manifests itself in a higher residual mass after decomposition.

The inventors are of the opinion that the increased thermal stability of the flame retardant in accordance with the invention is due to its specific structure, in principle, during the thermal decomposition of aminomethane phosphonates, initially, the weak P—C bond of the P—CH$_2$N group is broken. Although the P—C bond is in principle chemically and thermally stable, the α amino group stabilizes the carbon radical which is produced by the homolysis, so that the P—C bond in aminomethane phosphonates breaks even at lower temperatures. Because in the compounds from the prior art, the α amino group has a relatively low molecular weight then, following homolysis, the corresponding amine may escape as a gaseous product. Escape of the amine constitutes a thermodynamic driving force of the reaction, so that this occurs preferably, in the flame retardants of the present invention, a further phosphonate group is bonded to the carbon radical in the position α to the amino group, in this way, the amine has a higher molecular weight, whereupon in principle, it will escape to a substantially lesser extent. Because the amine can escape at lower temperatures, then they must have a lower mass, which can only be accomplished if the P—C bond to the second phosphonate group is cleaved homolytically. Because in this case a particularly unstable carbon anion would be produced, this reaction does not occur, or practically does not occur. Correspondingly, during decomposition in a polymer material, a significantly lower amine release occurs, and thus also a lower fume development is observed. Furthermore, because after bond cleavage the amine does not escape immediately, then the reverse reaction, i.e. combination of the two radicals to form the starting compound, is also possible. The effects mentioned above contribute to making cleavage of the P—C bond not as advantageous as in compounds from the prior art, so that the aminomethane phosphonates in accordance with the invention exhibit a significantly greater thermal stability.

In a preferred embodiment of the invention, the decomposition temperature, i.e. a loss of mass of the dry flame retardant, of 2% by weight, is only reached beyond a temperature of 200° C., particularly preferably 220° C., most particularly preferably beyond a temperature of 245° C.

Because the carbon atom in the position α to the amino group is doubly substituted with a phosphonate group, the flame retardants in accordance with the invention have a higher phosphorus content than the known prior art phosphonates. It has been shown that the flame retarding effect of the phosphorus-containing flame retardants increases with increasing phosphorus content. Thus, the effectiveness, i.e. the flame retarding effect per unit mass of the flame retardant used, is particularly high for the flame retardants in accordance with the invention. Even at low concentrations of flame retardant in the polymer material, then, a good flame retarding effect may be obtained. At the same time, the properties of the polymer material, in particular the processability and the extension at break, are barely influenced. In a preferred embodiment, the phosphorus content of the flame retardant is at least 19.5% by weight, preferably at least 20% by weight, particularly preferably at least 21.5% by weight, most preferably at least 23.5% by weight, in order for the phosphorus content of the flame retardant in accordance with the invention to be high, the groups R$^1$-R$^6$ advantageously have as low a mass as possible.

Particularly when added as an additive for one or more components of an advantageously catalysed polymerisation reaction, it may be advantageous to use the flame retardant in accordance with the invention as a salt or as an ester, particularly preferably as a salt. This avoids any possible interaction of free acid groups of the flame retardant with the components, for example with the catalyst for the reaction. Even with pH-sensitive polymer materials, i.e. polymer materials the structure of which is modified and/or which decompose by the action of acids, the flame retardant in accordance with the invention is advantageously used as a salt or ester. Furthermore, for applications of this type, the salt form is dissolved in wafer and homogeneously mixed in some way with the polyol. When the flame retardant is used as an ester, this can additionally result in better binding to the matrix because of being rendered hydrophobic, again resulting in better mechanical properties and less migration from the polymer.

In a preferred embodiment of the invention, therefore, at least one, preferably at least two, particularly preferably at least three, most preferably four of the groups R$^3$, R$^4$, R$^5$ and R$^6$ are a cation, wherein the cation is Na$^+$, K$^+$, Mg$^{2+}$, Ca$^{2+}$, B$^{3+}$, Al$^{3+}$, Zn$^{2+}$, NH$_4^+$ or the ammonium ion of an amine compound selected from the group consisting of melamine or its condensation products, preferably melam, melem, melon, urea, guanidine, morpholine and piperazine. Na$^+$ and Ca$^{2+}$ are particularly preferred. The use of Na$^+$ is most particularly preferred, because it has a low molar mass, and thus the proportion by weight of phosphorous in the flame retardant can be kept as high as possible.

In particular, when the polymer to be protected is not a non-polar polyolefin but a polar polymer such as a polyamide, a polyurethane, a polyurea or a polyester, it may be advantageous to use the flame retardant in accordance with the invention as an acid. Particularly when using co-condensation/addition components, the flame retardant is advantageously an acid. In a preferred embodiment of the invention, therefore, at least one, preferably at least two, particularly preferably at least three, most preferably four of the groups R$^3$, R$^4$, R$^5$ and R$^6$ are H. As an example, the flame retardant in accordance with the invention may advantageously be used in the form of an acid in a polyurethane foaming process as a co-addition component. Without wishing to be bound by this theory, the inventors are of the opinion that because of the reaction of isocyanate and phosphonic acid groups, the flame retardant is incorporated into the polymer, with the formation of a particularly stable P—O—C(=O)—N group, which has a positive effect on the decomposition behaviour of the polyurethane. This is also the case for other polymers which are produced by polyaddition, for example polyethylene oxides, polypropylene oxides, polyethylene glycols and polyureas. Here again, the phosphonic acid group reacts with one of the components and is therefore incorporated into the polymer. Particularly preferably, then, the flame retardant in accordance with the invention is used in the form of the acid as a co-addition component in the production of these polymers.

Analogously, in a preferred embodiment, the flame retardant in accordance with the invention is used in the form of the acid as a co-condensation component in a polycondensation reaction. The inventors are of the opinion that the phosphonic acid groups react with the hydroxy or amino groups of the components of the condensation reaction and are incorporated into the polymer in this manner. Thus, the flame retardants in accordance with the invention are preferably used in the form of the acid as a co-condensation component in the production of polyesters, polycarbonates and polyamides.

In a preferred embodiment of the invention, the groups $R^3$ and/or $R^4$ and/or $R^5$ and/or $R^6$ are organic groups containing more than two carbon atoms. Phosphonic acid esters with short-chain carbon groups, in particular methyl, are known from the prior art. Because these may have an alkylating effect under decomposition conditions, however, they may be highly toxic. As an example, human DNA may be permanently damaged. However, the alkylation effect decreases sharply with increasing chain length.

Polymer materials into which the flame retardant may be introduced are preferably selected from the group consisting of polyvinylbutyral (PVB), polypropylene (PP), polyethylene (PE), polyamide (PA), polyesters such as polybutylene terephthalate (PBT), polyethylene terephthalate (PET), polyurethane (PU), thermoplastic polyurethanes (TPU) polyurea, polyphenylene oxide, polyacetal, polyacrylate, polymethacrylate, polyoxymethylene, polyvinyl acetal, polystyrene, acrylonitrile-buta-diene-styrene (ABS), acrylonitrile-styrene-acrylic ester (ASA), polycarbonate, polyethersulphone, polysulphonate, polytetrafluoroethylene, polyurea, formaldehyde resins, melamine resins, polyetherketone, polyvinyl chloride, polylactide, polysiloxane, phenol resins, epoxy resins, poly(imide), bismaleimide-triazine, thermoplastic polyurethane, ethylene-vinyl acetate copolymer (EVA), polylactide (PLA), polyhydrobutyric acid (PHB), copolymers and/or mixtures of said polymers. Particularly preferably, the flame retardant in accordance with the invention is used in foams of the polymer materials mentioned above, particularly preferably in polyurethane foams. In this regard, the flame retardant is preferably added as an additive or co-condensation/addition component of the polyol component. If the flame retardant is added as an additive, then it is advantageously used as a salt or an ester. When the flame retardant is added as a co-condensation/addition component, this is preferably used as an acid.

Particularly preferably, in the flame retardants used for this purpose, $R^1$ and $R^2$ together, including the N atom, form a morpholine ring, so that a flame retardant with the structure of formula (II) is obtained:

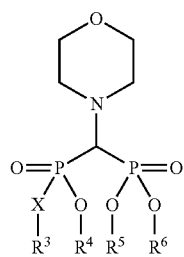

(II)

It has been observed that these phosphonates not only exhibit a flame retarding effect, but they can also catalyse polyurethane foaming.

In a preferred embodiment, the polymer material contains the flame retardant in a quantity of at least 1.5% by weight or at least 5% by weight or at least 10% by weight or at least 15% by weight and/or in a quantity of at most 35% by weight or at most 30% by weight or at most 25% by weight, with respect to the polymer composition as a whole.

With these quantities, on the one hand a good flame retardant action of the polymer composition is ensured, and on the other hand, the processing and material properties of the polymer material are only influenced to a small extent.

The flame retardant in accordance with the invention may advantageously be used in combination with other flame retardants, for example with those which retard flames by another mechanism. By means of the interaction of the flame retardant in accordance with the invention with other flame retardants, a synergistic effect may be obtained, i.e. an effect which is beyond the simple sum of the flame retarding action of the individual components.

In a preferred embodiment, the polymer material contains at least one further flame retarding corn-ponent, which is preferably selected from nitrogen bases, melamine derivatives, phosphates, pyrophosphates, polyphosphates, organic and inorganic phosphinates, organic and inorganic phosphonates and derivatives of the aforementioned compounds, preferably selected from ammonium polyphosphate, with melamine, melamine resin, melamine derivatives, silanes, siloxanes, polysiloxanes, silicones or polystyrenes, coated and/or coated and crosslinked ammonium polyphosphate particles, as well as 1,3,5-triazine compounds, including melamine, melam, meiem, melon, ammeiine, ammelide, 2-ureidomeiamine, acetoguanamine, benzoguanamine, diaminophenyltriazine, melamine salts and adducts, melamine cyan urate, melamine borate, melamine orthophosphate, melamine pyrophosphate, dimelamine pyrophosphate, aluminium diethylphosphinate, melamine polyphosphate, oligomeric and polymeric 1,3,5-triazine compounds and polyphosphates of 1,3,5-triazine compounds, guanine, piperazine phosphate, piperazine polyphosphate, ethylenediamine phosphate, pentaerythritol, dipentaerythritol, borophosphate, 1,3,5-trihydroxyethyl isocyanurate, 1,3,5-triglycidyl isocyanurate, triailyi isocyanurate and derivatives of the aforementioned compounds. In a preferred embodiment, the polymer material contains waxes, silicone, siloxanes, fats or mineral oils as further flame retarding components in order to improve dispersibility.

Preferably, the polymer material contains a phosphate, in particular ammonium polyphosphate, as a further flame retardant component in addition to the flame retardant in accordance with the invention. Because the solid phase activity of phosphates is usually higher than that of the phosphonates, but on the other hand phosphonates have a higher gas phase activity, a particularly good flame retarding action may be achieved by using a combination.

In a preferred embodiment, the ratio of the flame retardant in accordance with the invention to the at least one further flame retardant component in the polymer material is 1:18 to 1:1, preferably 1:9 to 1:4 and particularly preferably 1:6 to 1:4. These ratios are also valid for the use of ammonium polyphosphate as the further flame retardant component.

More preferably preferred, in addition to the flame retardant in accordance with the invention, the polymer material contains other fillers which are selected from calcium carbonate, silicates such as talc, clay or mica, kaolin or wollastonite, silica, calcium and barium sulphate, aluminium hydroxide, glass fibres and glass spheres, as well as wood flour, cellulose powder and activated charcoal and graphites. These fillers may endow the polymer material with further desirable properties. In particular, the price of the polymer material can be reduced in this manner, the polymer material can be coloured, or its mechanical properties can be improved, for example by reinforcement with glass fibres.

In a further embodiment of the invention, the polymer material has an overall halogen content of <1500 ppm by weight, preferably <900 ppm by weight. The halogen content can be determined using analytical methods which are familiar to the person skilled in the art, such as combustion ion chromatography (CIC). The particularly low halogen content is advantageous compared with the prior art flame retardants, because with the known flame retardants, a lot of halogen in the form of unwanted inorganically and organically bound halogens are introduced. The term halogen-free in the context of the invention allows for small amounts of contamination by halogens to be included in the said maximum quantities. The halogen content should in any event generally be kept low in order to avoid the disadvantageous effects of halogens.

If the flame retardant is incorporated into the polymer material to be protected in a transformation process, then during incorporation of the flame retardant, a dispersion agent is advantageously used. In a further embodiment of the invention, therefore, a dispersion agent is used in the polymer material in accordance with the invention in a quantity of 0.01 to 10% by weight, preferably in a quantity of 0.1 to 5.0% by weight with respect to the weight of the flame retardant in accordance with the invention, wherein the dispersion agent is preferably selected from fatty acid amides, including fatty acid monoamides, fatty acid bisamides and fatty acid alkanolamides, such as oleamides and erucamides, from fatty acid esters, including glycerol esters and wax esters, from C16 to C18 fatty acids, from fatty acid alcohols, including cetyl and stearyl fatty acid alcohols, from natural and synthetic waxes polyethylene waxes and oxidized polyethylene waxes and from metal stearates, preferably Ca, Zn, Mg, Ba, Al, Cd and Pb stearates. Adding the aforementioned dispersion agent improves the dosing capability of the flame retardant, the extrudability of the polymer material and the homogeneity of the dispersed flame retardant within the polymer material.

In a further embodiment of the invention, the flame retardant in accordance with the invention has a free water content (moisture content) of <0.6% by weight, preferably <0.4% by weight. A lower water content also improves the dosing capability of the flame retardant, the extrudability of the polymer material and the homogeneity of the dispersed flame retardant within the polymer material, and also prevents hydrolysis-governed decomposition.

The flame retardant may be introduced into the polymer material using a variety of means. First of all, the flame retardant may be incorporated into the polymer material during the moulding process. If, for example, the polymer material is processed by extrusion, then the flame retardant may be added in the extrusion process, for example by means of a masterbatch. A □masterbatch□ in the context of the present invention is a polymer material in the form of granulate or a powder, which contains the flame retardant and the optionally further additives in concentrations which are higher than in the final application. In order to produce the polymer material in accordance with the invention, the masterbatch or masterbatches are combined with other polymer materials without the flame retardant contained in the masterbatch in amounts or ratios that correspond to the desired concentrations of the flame retardant in the final product. Masterbatches have the advantage over the addition of various substances in the form of pastes, powders or liquids in that they guarantee high process reliability and are very easy to process and dose. The flame retardant is evenly distributed in the polymer material by means of the extrusion.

In another embodiment, the flame retardant is a co-condensation component or a co-addition component of the polymer material, which is used in the production of the polymer material by polycondensation or polyaddition. The flame retardant may be bonded onto the polymer material in this manner. Incorporation of the flame retardant into the polymer can be verified using suitable analytical techniques, in particular $^{31}$P NMR spectroscopy. In a particularly preferred embodiment, the polymer material is a polyester or a polyurethane. A corresponding procedure has the advantage that the flame retardant is securely bonded to the polymer material and thus can barely escape from the polymer material or not escape at all, i.e. □leaching□ is particularly low.

The invention also includes a flame retardant which is a compound with formula I, its corresponding ammonia salt, its corresponding phosphonate salt, or a mixture of the above, characterized in that at least one of the groups $R^3$, $R^4$, $R^5$ and $R^6$ is H or a cation, wherein the cation is $Na^+$, $K^+$, $Mg^{2+}$, $Ca^{2+}$, $B^{3+}$, $Al^{3+}$, $Zn^{2+}$, $NH_4^+$ or the ammonium ion of an amine compound selected from the group consisting of melamine or its condensation products, preferably melam, melem, melon, urea, guanidine, morpholine and piperazine.

The invention also includes the use of a compound in accordance with formula I, its corresponding ammonia salt, its corresponding phosphonate salt or a mixture of the above, as a flame retardant for rendering polymer materials, in particular thermoplastic polymers, flame retardant.

EXAMPLES

The invention will now be explained in more detail with the aid of specific embodiments of flame retardants in accordance with the invention, examples of the production of compositions in accordance with the invention, as well as with the aid of examples of flame retardants and with the aid of the accompanying figures.

Specific Embodiments of Flame Retardants in Accordance with the Invention

Embodiments with Dimethyl Groups

| # | | X | $R^3$ | $R^4$ | $R^5$ | $R^6$ |
|---|---|---|---|---|---|---|
| 1 |  | —O— | H | H | H | H |
| 2 |  | —O— | ethyl | ethyl | ethyl | ethyl |
| 3 |  | —O— | butyl | butyl | butyl | butyl |
| 4 |  | —O— | H | Na | Na | Na |

Embodiments with Diethyl Groups

| # | R¹R²N- | X | R³ | R⁴ | R⁵ | R⁶ |
|---|---|---|---|---|---|---|
| 5 |  | —O— | H | H | H | H |
| 6 | 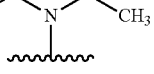 | —O— | ethyl | ethyl | ethyl | ethyl |
| 7 | 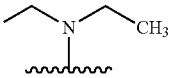 | —O— | butyl | butyl | butyl | butyl |
| 8 | 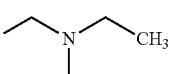 | —O— | H | Na | Na | Na |

Embodiments with Morpholine, MOMP

| # | R¹R²N- | X | R³ | R⁴ | R⁵ | R⁶ |
|---|---|---|---|---|---|---|
| 9 | 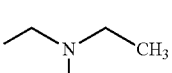 | —O— | H | H | H | H |
| 10 |  | —O— | ethyl | ethyl | ethyl | ethyl |
| 11 | 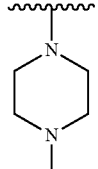 | —O— | butyl | butyl | butyl | butyl |
| 12 | 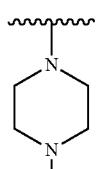 | —O— | H | Na | Na | Na |

Embodiments with Piperazine, PIMP

| # | R¹R²N- | X | R³ | R⁴ | R⁵ | R⁶ |
|---|---|---|---|---|---|---|
| 13 | 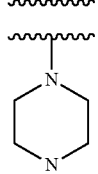 | —O— | H | H | H | H |
| 14 | 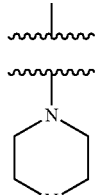 | —O— | ethyl | ethyl | ethyl | ethyl |
| 15 |  | —O— | butyl | butyl | butyl | butyl |
| 16 | 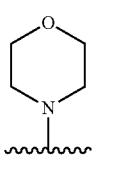 | —O— | H | Na | Na | Na |

Embodiments with 1,3,5-Triazine Cyclohexane Rings

| # | R¹R²N- | X | R³ | R⁴ | R⁵ | R⁶ |
|---|---|---|---|---|---|---|
| 17 |  | —O— | H | H | H | H |
| 18 | 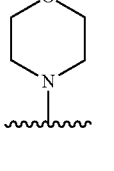 | —O— | ethyl | ethyl | ethyl | ethyl |

-continued

| # | R¹\N\R² | X | R³ | R⁴ | R⁵ | R⁶ |
|---|---|---|---|---|---|---|
| 19 | (triazine with two N attachment points, third N-) | —O— | butyl | butyl | butyl | butyl |
| 20 | (triazine with two N attachment points, third N-) | —O— | H | Na | Na | Na |

Embodiments with Cyclic Phosphonic Acid Esters

| # | R¹ | R² | X | R³–R⁴ (cyclic) | R⁵ | R⁶ |
|---|---|---|---|---|---|---|
| 21 | ethyl | ethyl | single bond | neopentyl cyclic phosphonate | H | H |
| 22 | ethyl | ethyl | single bond | neopentyl cyclic phosphonate | Na | Na |
| 23 | ethyl | ethyl | single bond | neopentyl cyclic phosphonate | ethyl | ethyl |
| 24 | ethyl | ethyl | single bond | neopentyl cyclic phosphonate | butyl | butyl |

Embodiments with Cyclic Phosphinic Acid Esters

| # | R¹ | R² | X | R³–R⁴ (cyclic) | R⁵ | R⁶ |
|---|---|---|---|---|---|---|
| 25 | ethyl | ethyl | single bond | DOPO | H | H |
| 26 | ethyl | ethyl | single bond | DOPO | Na | Na |
| 27 | ethyl | ethyl | single bond | DOPO | ethyl | ethyl |
| 28 | ethyl | ethyl | single bond | DOPO | butyl | butyl |

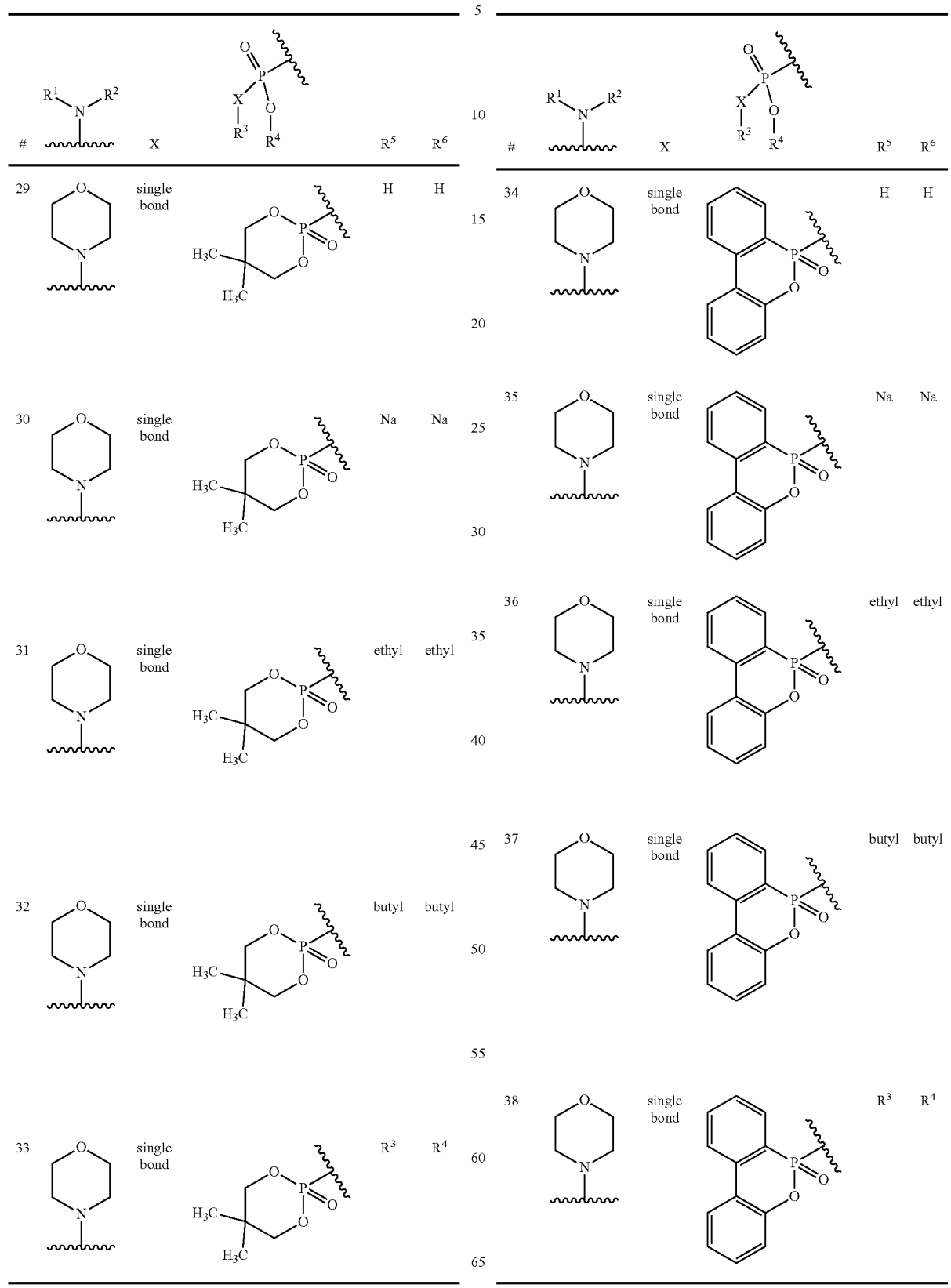

Embodiments with Melamine and Cyclic Phosphonic Acid Esters
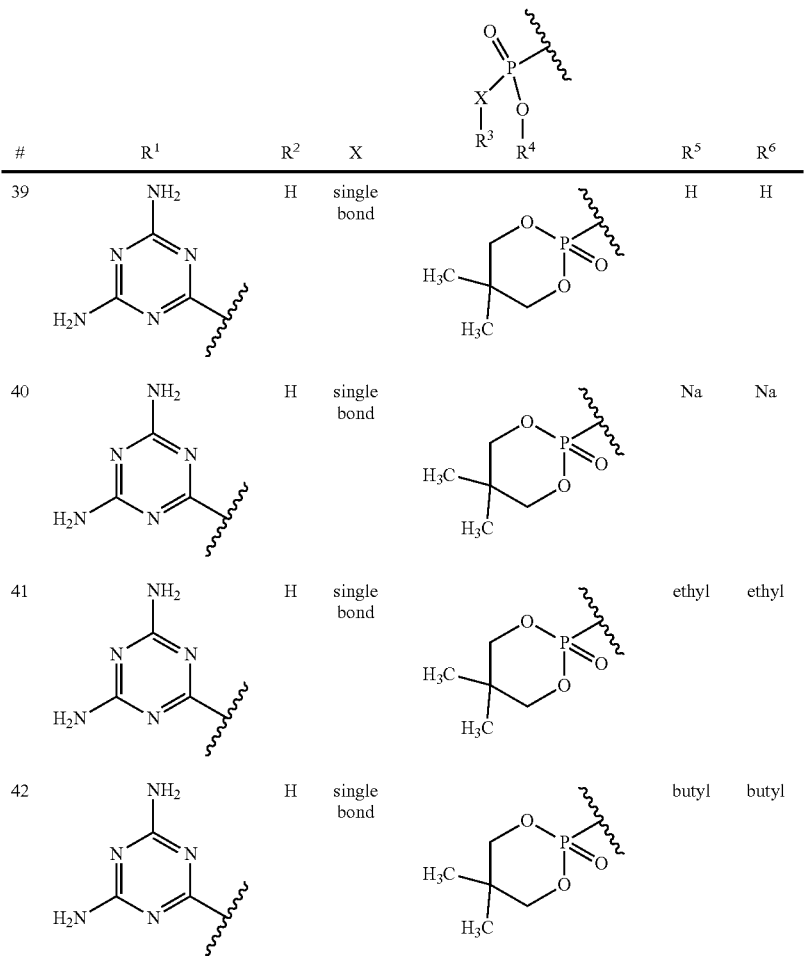
Embodiments with Melamine and Cyclic Phosphonic Acid Esters
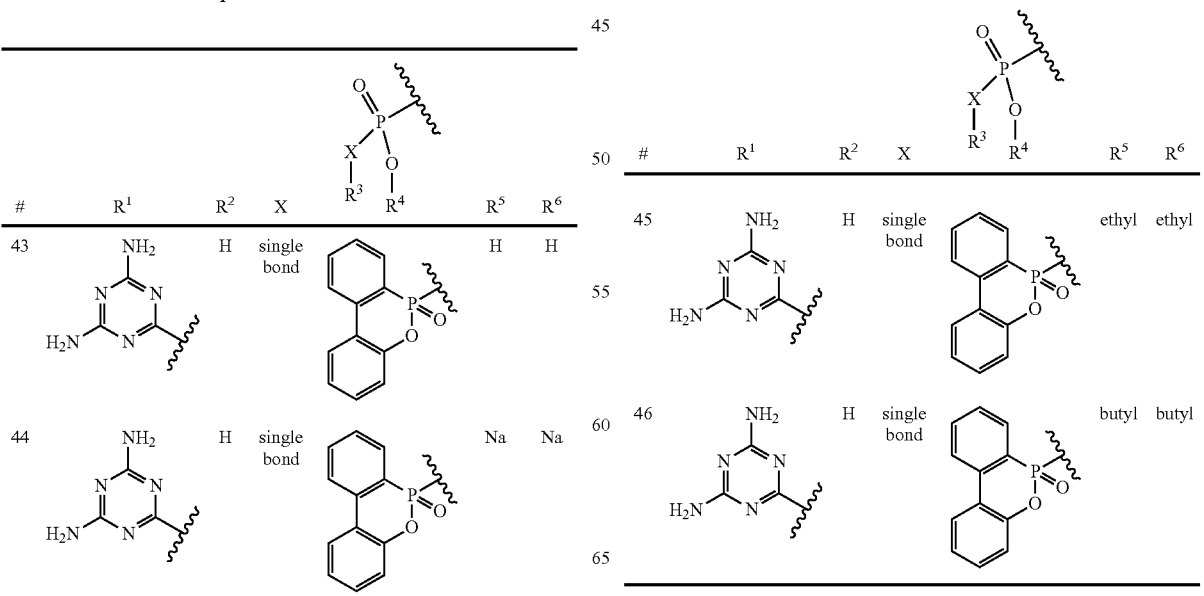

Embodiments with Melamine and Cyclic Phosphonic Acid Esters
| # | R¹ | R² | X | R³ R⁴ | R⁵ | R⁶ |
|---|---|---|---|---|---|---|
| 47 | 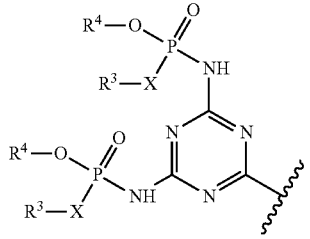 | H | single bond | 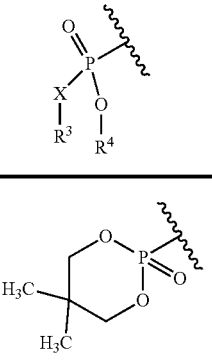 | H | H |
| 48 | 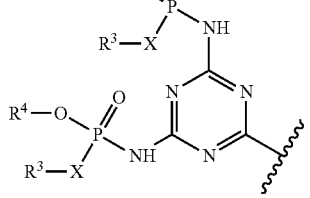 | H | single bond | 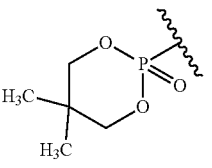 | Na | Na |
| 49 | 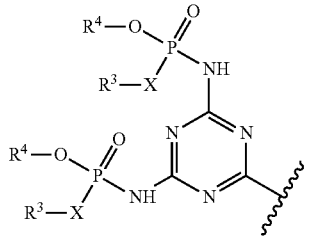 | H | single bond | 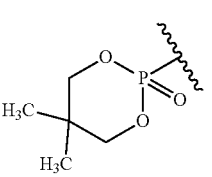 | ethyl | ethyl |
| 50 | 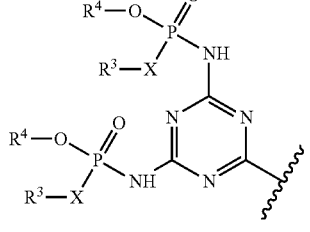 | H | single bond | 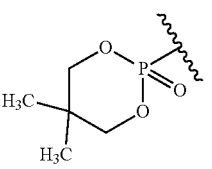 | butyl | butyl |

Embodiments with Melamine and Cyclic Phosphonic Acid Esters

| # | R¹ | R² | X | $\begin{array}{c}\text{O} \\ \| \\ \text{P} \\ / \ \backslash \\ \text{X} \ \ \text{O} \\ \| \ \ \ \| \\ \text{R}^3 \ \ \text{R}^4 \end{array}$ | R⁵ | R⁶ |
|---|---|---|---|---|---|---|
| 51 | (bis-phosphoramide melamine group) | H | single bond | (dibenzo[c,e]oxaphosphinine 6-oxide group) | H | H |
| 52 | (bis-phosphoramide melamine group) | H | single bond | (dibenzo[c,e]oxaphosphinine 6-oxide group) | Na | Na |
| 53 | (bis-phosphoramide melamine group) | H | single bond | (dibenzo[c,e]oxaphosphinine 6-oxide group) | ethyl | ethyl |
| 54 | (bis-phosphoramide melamine group) | H | single bond | (dibenzo[c,e]oxaphosphinine 6-oxide group) | butyl | butyl |

Examples of Production of Compositions in
Accordance with the Invention

Starting materials:

| Name | Manufacturer | Purity/$M_n$ | CAS |
|---|---|---|---|
| 4-formylmorpholine | Alfa Aesar | 99% | 4394-85-8 |
| N,N-dimethylformamide | Merck KGaA | ≥99% | 68-12-2 |
| Phosphonic acid | Alfa Aesar | 99+ % | 4394-85-8 |
| Acetic acid anhydride | Merck KGaA | ≥98% | 108-24-7 |
| Methylene diphenylisocyanate (MDI) | Sigma Aldrich | $M_n$~340 | 9016-87-9 |
| Polyol | Sigma Aldrich | $M_n$~4000 | 9082-00-2 |
| Pentane | Sigma Aldrich | anhydrous, ≥99 | 109-66-0 |
| Ethylene glycol | Sigma Aldrich | anhydrous, 99.8 | 107-21-1 |

Further flame retardants:

Budit 240: phosphorus-containing, partially crosslinked polyacrylate, produced in accordance with Example 1 of WO 2014/124933

Budit 315: melamine cyanurate from Chemische Fabrik Budenheim KG

Budit 342: melamine polyphosphate from Chemische Fabrik Budenheim KG

Budit 667: intumescent flame retardant system from Chemische Fabrik Budenheim KG based on ammonium polyphosphate TCPP: tris(2-chloroisopropyl)phosphate, TCPP, from Sigma Aldrich (CAS: 13674-84-5)

OP 550: Phosphorus-containing polyol, Exolit OP 550 from Clariant AG (CAS: 184538-58-7)

Measurement Methods:

Dynamic differential calorimetry (DSC) measurements were carried out with an instrument for simultaneous thermogravimetric analysis and differential scanning calorimetry (STA/TG-DSC), model STA409 PC/3/H Luxx, from Netzsch Gerätebau GmbH, in the range from 25° C. to 500° C., under a nitrogen atmosphere with a heating rate of 10K/min. The samples weighed approximately 15 mg. NETZSCH Proteus software was used for the analysis.

Thermogravimetric analyses (TGA) were carried out with an instrument for simultaneous thermogravimetric analysis and differential scanning calorimetry (STA/TG-DSC), model STA409 PC/3/H Luxx, from Netzsch Gerätebau GmbH, in the range from 25° C. to 800° C., under a nitrogen atmosphere with a heating rate of 10 K/min. The samples weighed 12-15 mg. NETZSCH Proteus software was used to analyse the TGA curves.

Example 1: Synthesis of Morpholine Methylamino Diphosphonic Acid (MOMP-$H_4$)

0.1 mol of 4-formylmorpholine was placed in a 500 ml round bottomed flask and mixed with 0.2 mol of phosphonic acid and 30 ml of acetic acid anhydride. The reaction solution was stirred at 65° C. for 90 minutes. Next, the acetic acid formed as well as excess water were removed in a rotary evaporator under reduced pressure of ~ 30 mbar and the residue was freed from the remaining solvent at S5° C. in a drying cabinet for 4 hours.

Example 2: Synthesis of Piperazine Di(Methylamino Diphosphonic Acid) (PIMP-$H_4$)

0.28 mol of phosphonic acid was dissolved, with stirring, in a 250 ml round bottomed flask in 31 ml of demineralized water. To this end, over a time period of 15 min, a solution of 0.07 mol of diformyl piperazine in 30 ml of demineralized water was added dropwise. During the addition, a temperature rise of a few degrees was observed. After addition was complete, the reaction mixture was stirred for a further 3 h under reflux. After cooling the solution, excess water was removed using a rotary evaporator. A saturated piperazine solution was added dropwise to the liquid distillation residue. An amorphous white precipitate formed with the development of heat.

Example 3: Synthesis of Dimethyl Methylamino Diphosphonic Acid (DAMP-$H_4$)

0.9 mol of dimethylformamide was placed in a 500 mL round bottomed flask and mixed with 1.8 mol of phosphonic acid and 225 mL of acetic acid anhydride. The reaction solution was stirred at 90° C. for 90 minutes. Next, the acetic acid formed as well as excess water were removed in a rotary evaporator under reduced pressure of ~ 300 mbar and the residue was freed from the remaining solvent at 85° C. in a drying cabinet for 4 hours.

Example 4: Synthesis of an Aqueous Solution of the Trisodium Salt of Morpholine Methylamino Diphosphonic Acid (MOMP-H-$Na_3$)

0.289 mmol of morpholine methylamino diphosphonic acid (MOMP-$H_4$) was dissolved in 50 ml of demineralized water and 0.867 mmol of NaOH was added. A pH of ~9 was obtained for the solution.

Example 5: Synthesis of Morpholine Methylamino Diphosphonic Acid Tetraethyl Ester (MOMP-$Et_4$)

In order to produce MOMP-$Et_4$, 0.1 mol of morpholine was placed in the reactor and stirred. A further 0.1 mol of triethoxymethane was added dropwise. Next, 0.2 mol of diethylphosphate was added. The mixture was heated to 120° C. and stirred for 4 hours at this temperature. After the reaction was complete, the product was purified by vacuum distillation at 50 mbar and 150° C.

| Name | Manufacturer | Purity | CAS | Molar mass |
|---|---|---|---|---|
| Morpholine | Merck | ≥99.0% | 110-91-8 | 87.12 g/mol |
| Triethoxymethane | Alfa Aesar | 98% | 122-51-0 | 148.20 g/mol |
| Diethylphosphite | Acros Organics | 98% | 762-04-9 | 138.10 g/mol |

In a preferred embodiment of the invention, all of the groups $R^3$, $R^4$, $R^5$ and $R^6$ are cations or organic groups, particularly preferably ethyl, because appropriately substituted compounds may act as a catalyst in the polyurethane foam synthesis. The use of compounds of this type is particularly advantageous, because they both accelerate the synthesis of the polyurethane and also improve the flame retardant properties of the prepared polymer. Compounds with P—OH groups such as MOMP-H$_4$, for example, do not exhibit a corresponding catalytic action, probably because it is present in the form of a zwitterion (PO$^-$/NH$^+$), the quaternary amino group of which does not exhibit any catalytic properties.

What is known as the start time to foam formation is significantly shorter when appropriately substituted compounds are used compared with compounds with P—OH groups such as MOMP-H$_4$, for example, as was shown in the following tests.

General method: polyol (22.5 g) was mixed with the catalyst (ethylene glycol, 1.05 g), pentane (4.5 g) and the respective flame retardant at 1000 rpm. The isocyanate (MDI, 60.0 g) was added with the disperser switched off and the mixture was stirred for 10 seconds at 1500 rpm then decanted immediately.

| Flame retardant | Charge [php]* | Time [s] to foam formation |
|---|---|---|
| None | 0 | 15 |
| MOMP-H$_4$ | 7.5 | 15 |
| MOMP-H$_4$ | 5.0 | 10 |
| MOMP-H$_4$ | 2.5 | 5 |
| MOMP-Et$_4$ | 10 | 0-1 |
| Exolit OP 550 | 7.5 | 15 |
| Exolit OP 550 | 2.5 | 15 |
| TCPP | 7.5 | 10 |
| TCPP | 2.5 | 10 |

*php-parts per hundred parts of polyol

Example 6: Synthesis of Morpholine Methylamino Di-DOPO (MOM-DOPO2)

| Name | MP | BP | M |
|---|---|---|---|
| DOPO (Metadynea DOP11 S25) | ~120° C. | ~400° C. | 216.18 g/mol |

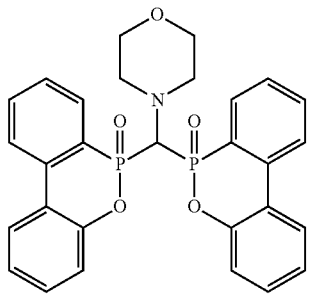 [SMILES: O=P1(C(N2CCOCC2)P2(=O)Oc3ccccc3-c3ccccc32)Oc2ccccc2-c2ccccc21]

| Name | MP | BP | M |
|---|---|---|---|
| 4-FM (AlfaAesar >98%) | 20° C. | 240° C. | 115.13 g/mol |
| Ac$_2$O (Merck >98%) | −73° C. | 139° C. | 102.09 g/mol |
| MOM-DOPO$_2$ | n.a. | n.a. | 529.47 g/mol |
| Water | 0° C. | 100° C. | 18.02 g/mol |
| Acetic acid | 17° C. | 118° C. | 60.05 g/mol |

The reaction was a condensation reaction in which the product MOM-DOPO2 was formed, from the formyl function on the 4-formylmorpholine (4-FM) and from the P—H groups of the DOPO molecules, with the elimination of H$_2$O. To this end, 40 g of DOPO was dissolved in 100 mL of acetic acid anhydride (Ac$_2$O) in a 250 mL flask and the mixture was heated to 120° C. When the temperature had been reached, 10 g of 4-FM was added. After 5 hours, it was neutralized with 80 mL of water and allowed to cool in the temperature of the environment. After cooling, a white solid precipitated out which was filtered off and washed with water. Acetic acid was formed as a further by-product.

Example 7: Synthesis of Morpholine Methylamino Diphosphonic Acid Zn Salt (MOMP-H$_2$Zn)

To produce the Zn salt (1:1), 50.0 g (0.191 mol) of MOMP was dispersed in 500 g of H$_2$O and 14.6 g ZnO (0.191 mol) was added. The reaction mixture was heated to 95° C. and stirred for 4 hours at this temperature. Next, the batch was cooled to 50° C. and the solid was separated from the mother liquor. The filter cake was dried at 120° C. in the ambient air.

| Name | Manufacturer | Purity/M$_n$ | CAS |
|---|---|---|---|
| MOMP | see Example 1 | | |
| ZnO | Alfa Aesar | min. 99.0% | 1314-13-2 |
| H$_2$O dist.. | | | |

Example 8: Synthesis of Piperazine Dimethylamino Diphosphonic Acid (PIMP-H$_4$)

| Name | Manufacturer | Purity | CAS | Molar mass |
|---|---|---|---|---|
| 1,4-diformylpiperazine | Alfa Aesar | 98+% | 4164-39-0 | 142.16 g/mol |
| Acetic acid anhydride | VWR | AnalaR NORMAPU | 108-24-7 | 102.09 g/mol |

| Name | Manufacturer | Purity | CAS | Molar mass |
|---|---|---|---|---|
| Phosphoric acid H₂O dist. | Alfa Aesar | 97% | 13598-3-2 | 82.0 g/mol |
| NaOH solution, 50% | | | 1310-73-2 | 39.997 g/mol |
| Sulphuric acid | Merck | 95-97% | 7664-93-9 | 98.08 g/mol |

0.1 mol of 1,4-diformylpiperazine and 0.1 mol of acetic acid anhydride were placed in the reactor and stirred. The mixture was heated to 120° C. Separately, 0.4 mol of phosphoric acid was dissolved in 0.3 mol of acetic acid anhydride. This solution was then added dropwise to the reactor. Next, a further 0.5 mol of acetic acid anhydride was added and the batch was heated to 135° C. After a reaction time of 30 minutes, 2.1 mol of water was added dropwise. After a further reaction time of 40 minutes, the batch was cooled to room temperature. Next, 70 mL of sodium hydroxide solution was added. The product was separated from the mother liquor and dissolved in water. Next, the solution was precipitated again with sulphuric acid and the product was filtered off, washed and dried.

Examples of Flame Retardants

Compositions

In order to test the flame retardant properties and in order to classify the flame retardant compositions in accordance with the invention in a variety of polymers, the UL94 test was carried out on IEC/DIN EN 60695-11-10 standardized test specimens.

UL94-V Test

Per measurement, 5 test specimens were fixed in a vertical position and a Bunsen burner flame was held at the free end. In this regard, the burning time and also dripping of burning parts were evaluated with the aid of a cotton wool pad disposed below the test specimen. The exact implementation of the test and flame treatment with a 2 cm high Bunsen burner flame were carried out in accordance with the protocols from Underwriter Laboratories, Standard UL94.

The results were given as classifications into the flame retardant classes V-0 to V-2. In this regard, V-0 means that the total burn time for 5 tested test specimens was less than 50 seconds and the cotton wool pad was not set alight by dripping glowing or burning components of the test specimen. The classification V-1 means that the total burn time of 5 tested test specimens was more than 50 seconds but less than 250 seconds and again the cotton wool pad was not set alight. V-2 means that the total burn time of 5 tested test specimens was less than 250 seconds, but the cotton wool pad was set alight by dripping test specimen components in at least one of the 5 tests. The abbreviation NC stands for ☐not classifiable☐ and means that a total burn time of more than 250 seconds was measured, in many cases of non-classifiability, the test specimen burned up completely.

UL94-HB Test

At least 3 test specimens per measurement were fixed in a horizontal position and a Bunsen burner flame was held at the free end. In this respect, the burning rate and the total burn length were evaluated. The exact procedures for the tests and for burning treatment with a 2 cm high Bunsen burner flame were as described by Underwriter Laboratories, Standard UL94.

The results are given as a classification into the fire retardant classification HB. The classification ☐HB☐ means that the burning rate between two marks, the first 25 mm from the burning end, the 20 second 100 mm away from the burning end, was less than 40 mm/min. In addition, the flame front did not go beyond the 100 mm mark. The abbreviation NC stands for ☐non classifiable☐ and means that over a length of 75 mm, the burning rate >40 mm/min or the total burn length was >100 mm.

Example 9: Flame Retarding Properties of MOMP-H₄ in Polypropylene

Polymers

In order to produce the flame retardant compositions, the following polymer materials were used in the examples below:

Polypropylene (PR) HD120 MO from Borealis AG

A granulate with a grain size of approximately 3×1×1 mm was produced with the aid of a twin screw extruder, Process 11 model, from Thermo Fisher Scientific Inc., under extrusion conditions which were normal for polypropylene. The extrusion process was carried out at a throughput of approximately 5-7 kg/h and with a screw speed of 450-500 rpm and a temperature in the extrusion zone of 190-220° C. Good quality UL94-compatible test specimens were obtained upon subsequent hot pressing. The thickness of the test specimens was 1.8 or 3.2 mm. During the extrusion process, the phosphonate produced in accordance with Example 1 was incorporated into the polymer material.

TABLE 1

| # | PP [%] | Thickness [mm] | MOMP [%] | Budit 667 | Budit 240 | UL94 | $t_1$ | $t_2$ | $t_{total}$ |
|---|---|---|---|---|---|---|---|---|---|
| 0 | 100 | 1.6 | 0 | — | — | N.C. | 376* | —* | 376 |
| 1 | 75 | 1.6 | 25 | — | — | N.C. | 95 | 70 | 165 |
| 2 | 72.5 | 1.6 | 27.5 | — | — | V-2 | 9 | 54 | 63 |
| 3 | 75 | 3.2 | 25 | — | — | V-0. | 4 | 6 | 10 |
| 4 | 72.5 | 3.2 | 27.5 | — | — | V-0 | 4 | 4 | 8 |
| 5 | 75 | 3.2 | — | 25 | — | V-0 | 5 | 5 | 10 |
| 6 | 75 | 1.6 | — | — | 25 | N.C | 231 | 34 | 265 |
| 7 | 72.5 | 1.6 | — | — | 27.5 | N.C | 227 | 28 | 255 |

Example 10: Flame Retardant Properties of MOMP-H₄ in Polyurethane (PU)

In order to produce the flame retardant compositions, the following components were reacted together in a foaming reaction:
polyol: 22.5 g
catalyst (ethylene glycol): 1.05 g
pentane: 4.5 g
isocyanate (MDI): 60 g The flame retardant in accordance with the invention was added to the polyol component prior to the reaction. The proportions by weight of flame retardant shown in the following table are with respect to the sum of the masses of polyol, catalyst, flame retardant and isocyanate,

| # | PU [%] | Flame retardant [%] | Charge [%] | UL94-HB | $t_{total}$ |
|---|---|---|---|---|---|
| 0 | 100 | — | — | N.C. | 50 |
| 1 | 98.2 | MOMP-H$_4$ | 1.8 | HB | 7 |
| 2 | 98.2 | MOMP-2K$^\#$ | 1.8 | N.C. | 30 |
| 3 | 91.8 | MOMP-2K$^\#$ | 8.2 | N.C. | 20 |
| 4 | 98.2 | DAMP-H$_4$ | 1.8 | HB | 4 |
| 5 | 98.2 | TCPP | 1.8 | N.C. | 26 |
| 6 | 97.1 | OP 550 | 2.9 | HB | 32 |
| 7 | 97.4 | MOMP-Et$_4$ | 2.6 | HB | 4 |
| 8** | 97.4 | MOMP-Et$_4$ | 2.6 | HB | 6 |

$^\#$double potassium salt of MOMP-H$_4$
**without catalyst

Example 11: Flame Retardant Properties of MOMP-H$_4$ in Thermoplastic Polyurethane (TPU)

The following polymer materials were used to produce the flame retardant compositions in the following examples:

Example 12: Flame Retardant Properties of MOMP-H$_2$Zn in Thermoplastic Polyamide (PA)

The following polymer materials were used to produce the flame retardant compositions in the following examples:
polyamide 6: Ultramid B3S (BASF)
glass fibres (GF) for PA: CS7928 (Lanxess)

A granulate with a grain size of approximately 3×1×1 mm was produced with the aid of a twin screw extruder, Process 11 model, from Thermo Fisher Scientific Inc., under extrusion conditions which were normal for PAS. The extrusion process was carried out at a throughput of approximately 5 kg/h and with a screw speed of 300 rpm and a temperature in the extrusion zone of 280° C. Good quality UL94-compatible test specimens were obtained upon subsequent hot pressing. The thickness of the test specimens was 0.8 mm. During the extrusion process, the phosphonate produced in accordance with Example 7 (MOMP-H$_2$Zn) was incorporated into the polymer material.

| # | PA6 [%] | GF [%] | Budit 611 [%] | Exolit** [%] | MOMP-H$_2$Zn | Budit 341 [%] | UL94-V | $t_1$ [s] | $t_2$ [s] | $t_{total}$ [s] | Info |
|---|---|---|---|---|---|---|---|---|---|---|---|
| 0 | 44.8 | 30 | 23 | 2.2 | | | V0 | 8 | 10 | 18 | |
| 1 | 55 | 30 | | | 15 | | N.C. | 243 | ~ | | butc |
| 2 | 50 | 30 | | | 20 | | V0 | 12 | 5 | 17 | |
| 3 | 45 | 30 | | | 25 | | V0 | 6 | 2 | 8 | |
| 4 | 45 | 30 | | | 17.5 | 7.5 | V0 | 9 | 9 | 18 | |

*butc = test specimen burned up to clamp
**Exolit OP 1230
~no second flame treatment possible because test specimen had already burned out after first ignition Thermoplastic polyurethane: (TPU) Elastollan 1185 A from BASF SE A granulate with a grain size of approximately 3×1×1 mm was produced with the aid of a twin screw extruder, Process 11 model, from Thermo Fisher Scientific Inc., under extrusion conditions which were normal for TPU. The extrusion process was carried out at a throughput of approximately 5 kg/h and with a screw speed of 300 rpm and with a temperature in the extrusion zone of 205° C. Good quality UL94-compatible test specimens were obtained upon subsequent hot pressing. The thickness of the test specimens was 0.8 mm. During the extrusion process, the phosphonate produced in accordance with Example 1 was incorporated into the polymer material.

DESCRIPTION OF THE FIGURES

The accompanying figures represent thermogravimetric measurements, which show:
FIG. 8: thermogravimetric measurement of MOMP-Et$_4$

| # | TPU [%] | Budit 315 [%] | Budit 342 [%] | Budit 240 [%] | MOMP [%] | Charge [%] | UL94 | $t_1$ | $t_2$ | $t_{total}$ | Info |
|---|---|---|---|---|---|---|---|---|---|---|---|
| 0 | 100 | — | — | — | — | 0 | N.C. | 323⁻ | —⁻ | 323 | butc* |
| 1 | 90 | — | 5 | — | 5 | 10 | V-2 | 4 | 2 | 6 | 4/5 dite$^\#$ |
| 2 | 90 | 5 | — | — | 5 | 10 | V-0 | 2 | 4 | 6 | — |
| 3 | 90 | — | — | — | 10 | 10 | V-0 | 9 | 5 | 14 | — |
| 4 | 90 | 10 | — | — | — | 10 | V-0 | 3 | 5 | 8 | — |
| 5 | 90 | — | 10 | — | — | 10 | V-2 | 11 | 5 | 16 | 5/5 dite$^\#$ |
| 6 | 90 | 5 | — | 5 | — | 10 | V-2 | 3 | 1 | 4 | 5/5 dite$^\#$ |

Figure 1:
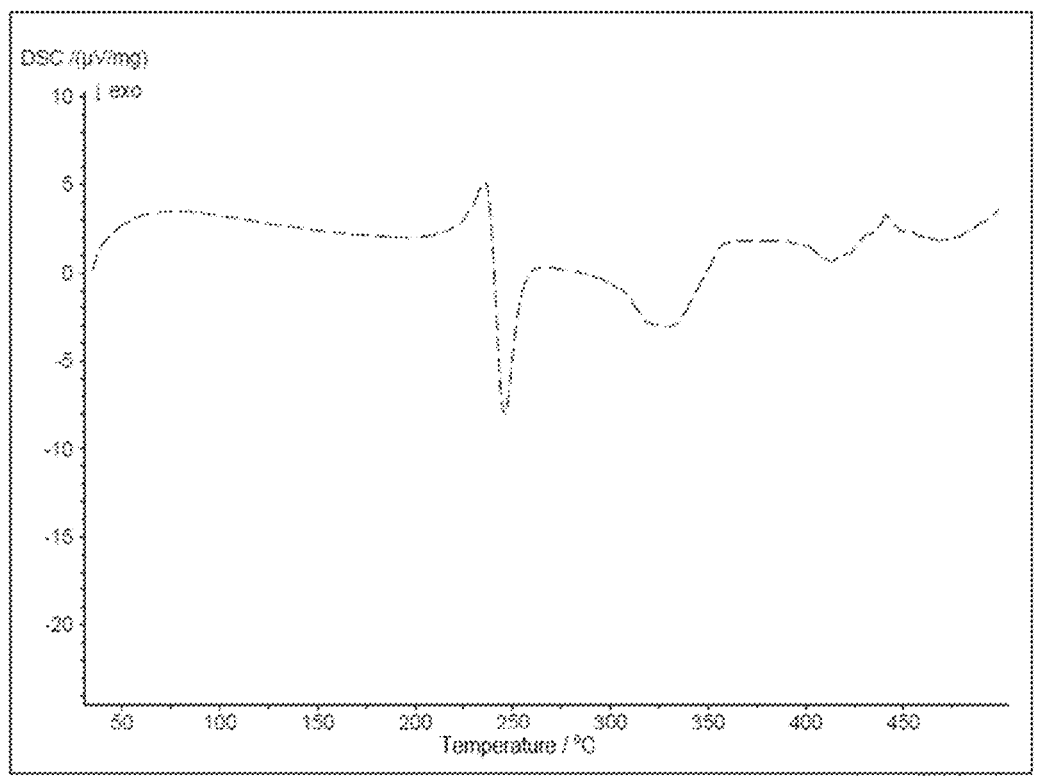
FIG. 1: differential scanning calorimetric measurement of DAMP-H$_4$
Figure 2:
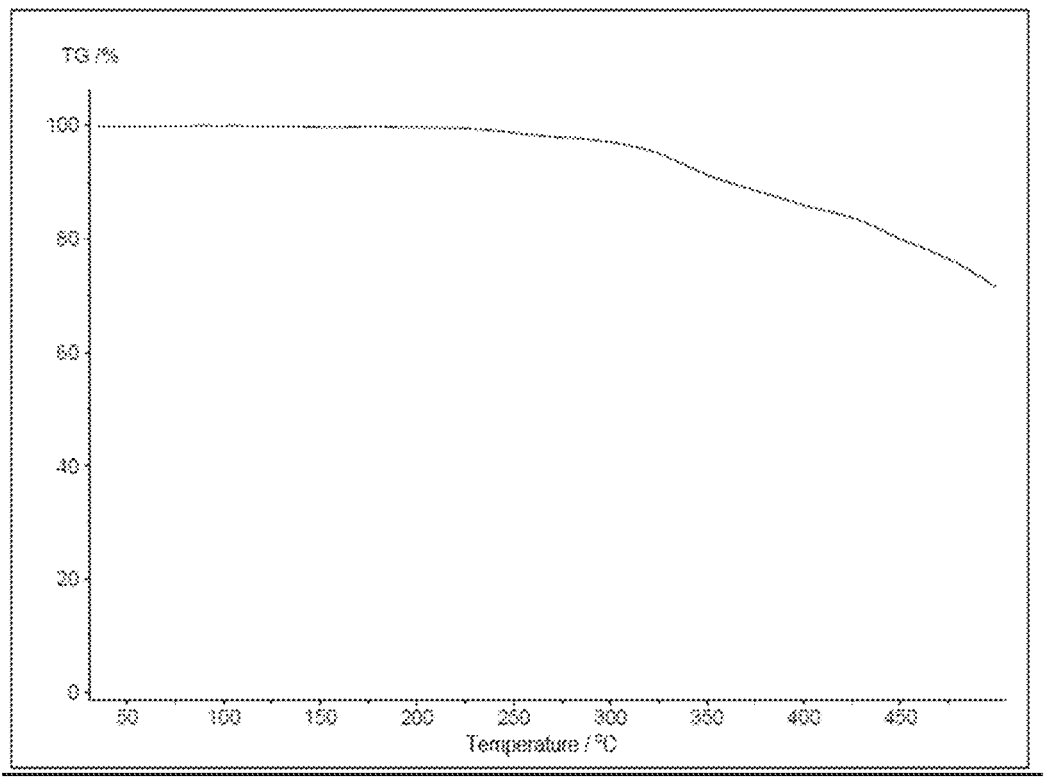
FIG. 2: thermogravimetric measurement of DAMP-H$_4$
Figure 3:
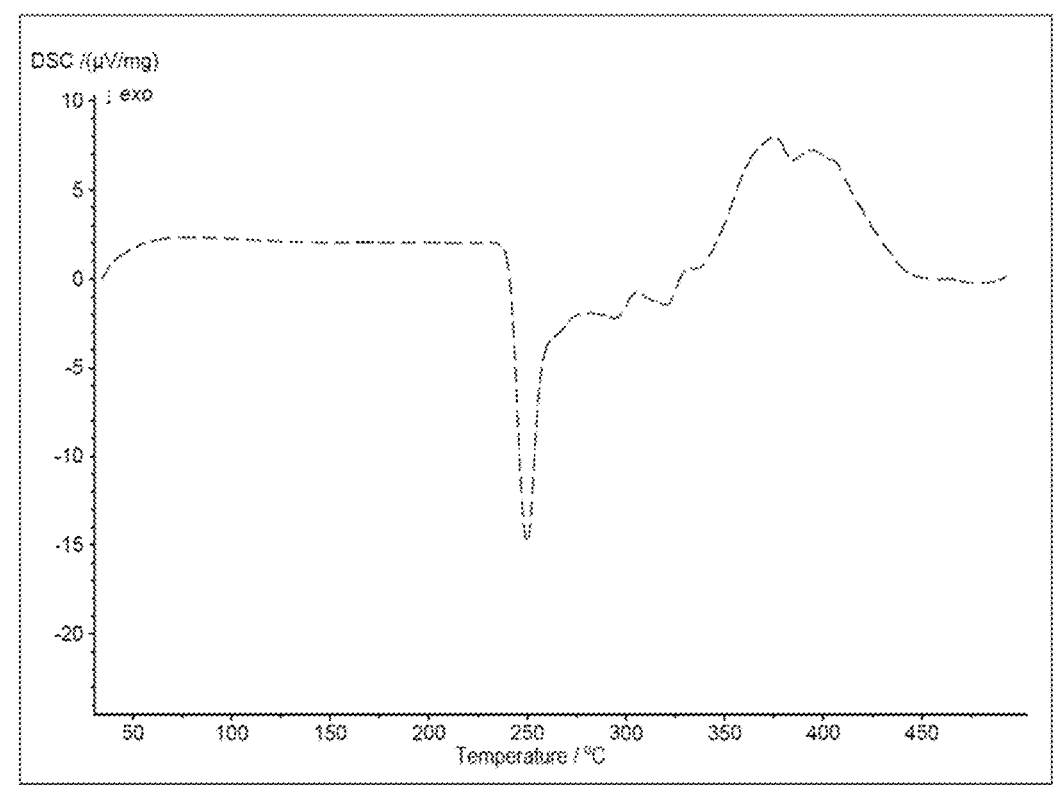
FIG. 3: differential scanning calorimetric measurement of MOMP-H$_4$
Figure 4:
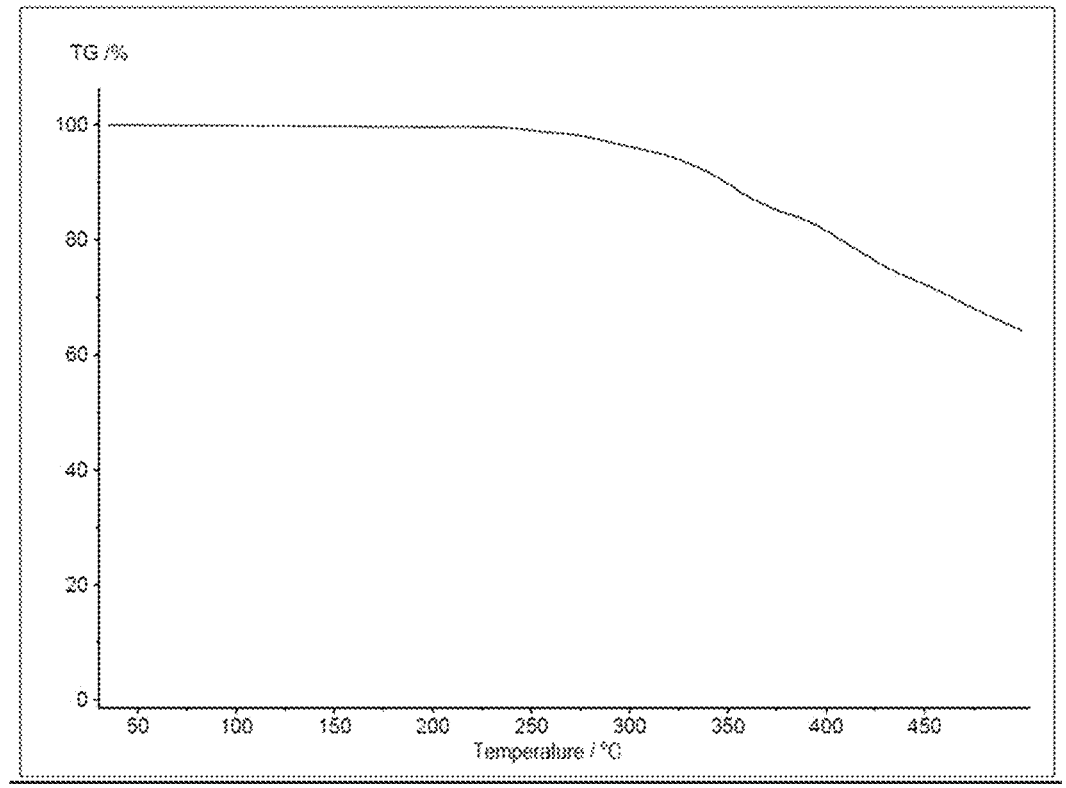
FIG. 4: thermogravimetric measurement of MOMP-H4
Figure 5:
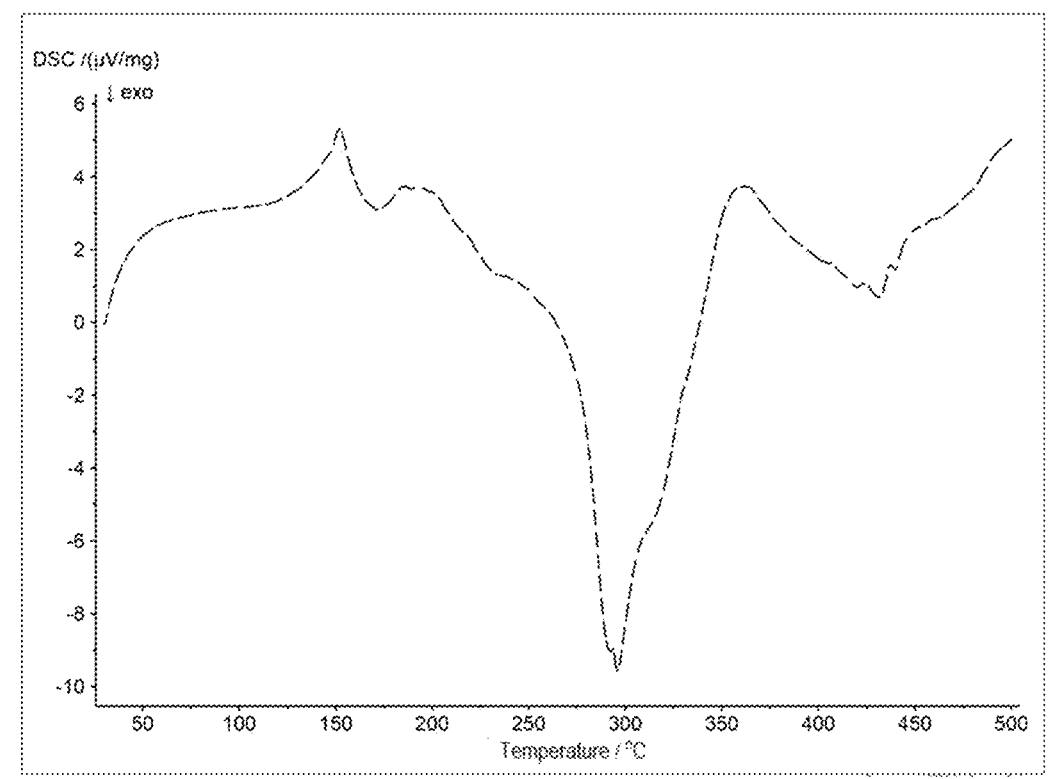
FIG. 5: differential scanning calorimetric measurement of ATMP
Figure 6:
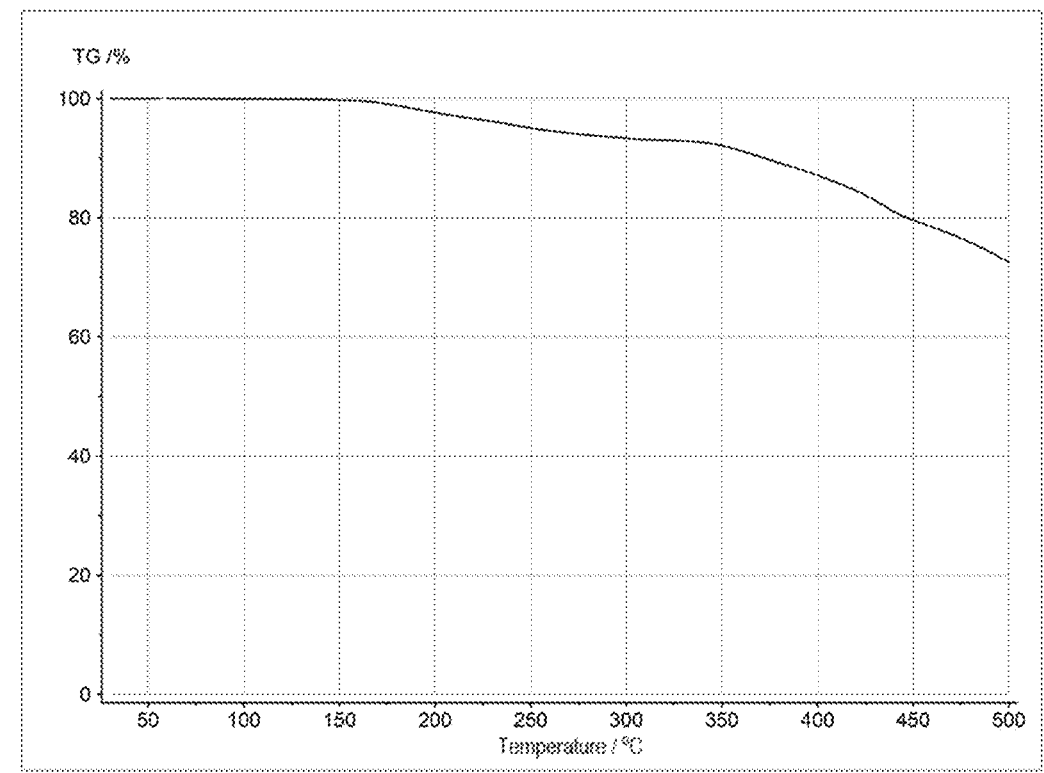
Figure 7:
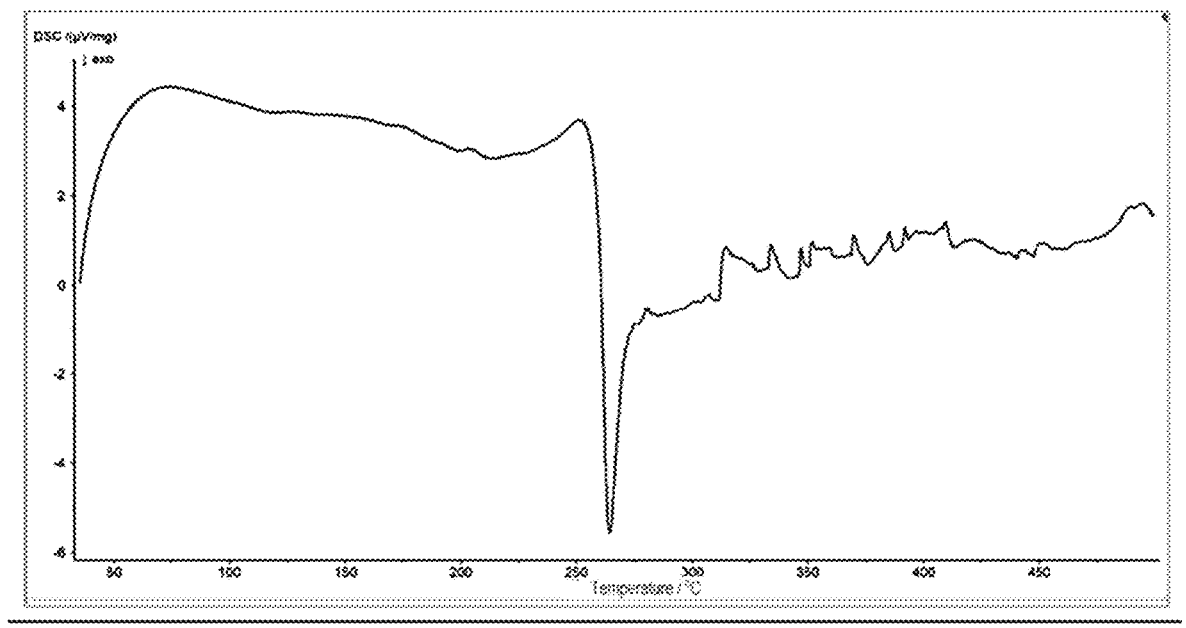
FIG. 7: differential scanning calorimetric measurement of MOMP-Et$_4$
Figure 8:
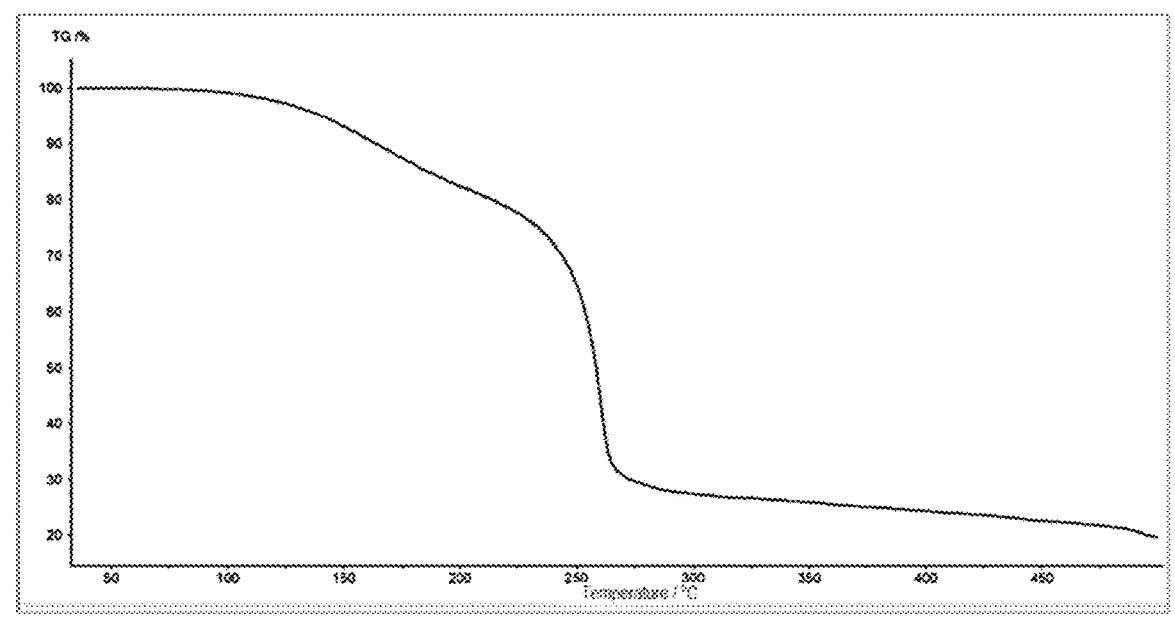
FIG. 8: thermogravimetric measurement of ATMP
Figure 9:
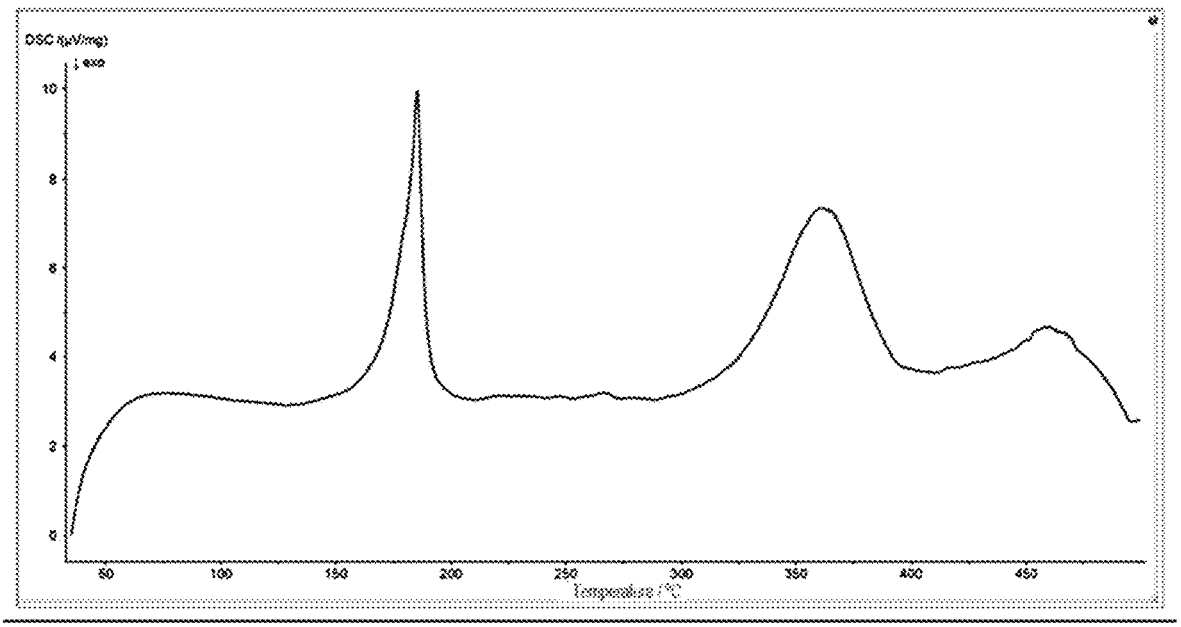
FIG. 9: differential scanning calorimetric measurement of MOMP-DOPO$_2$
Figure 10:
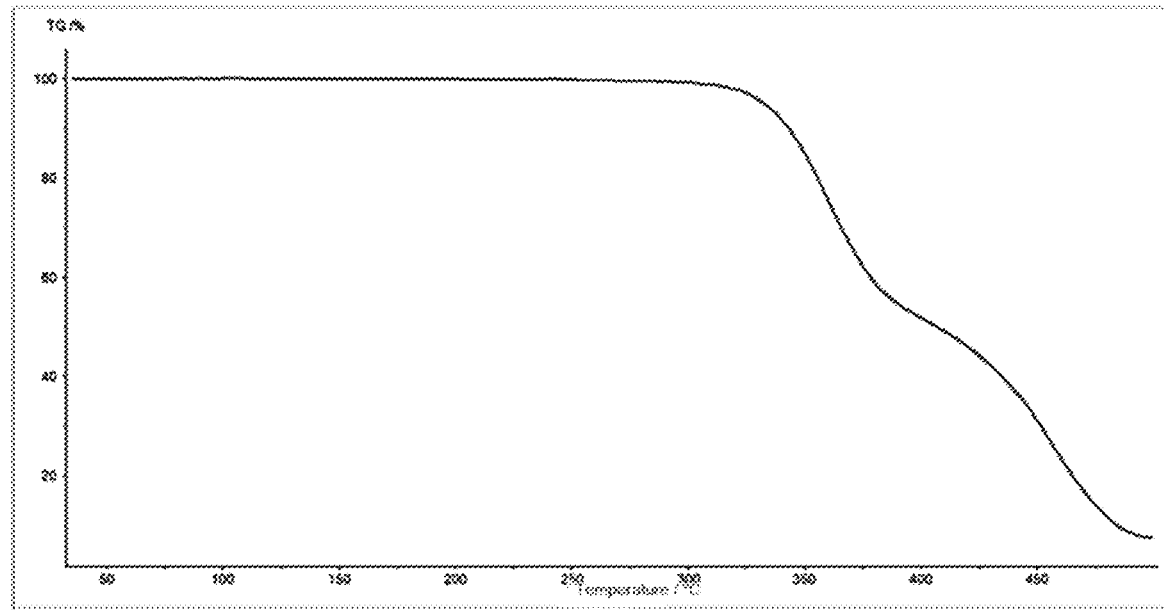
Figure 11:
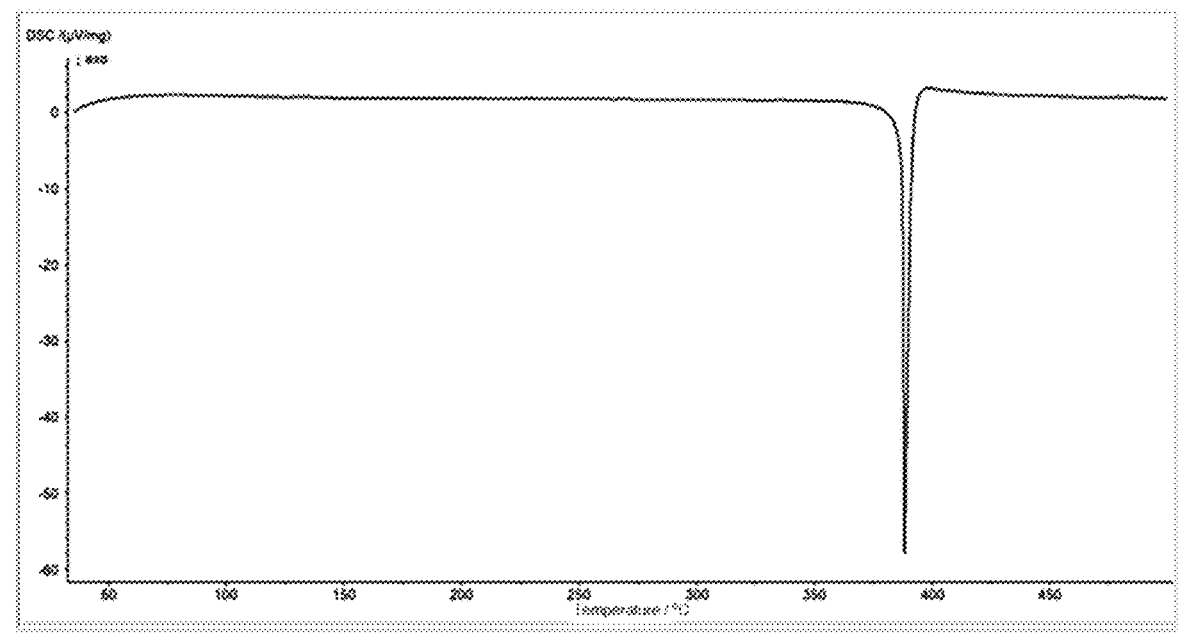
Figure 12:
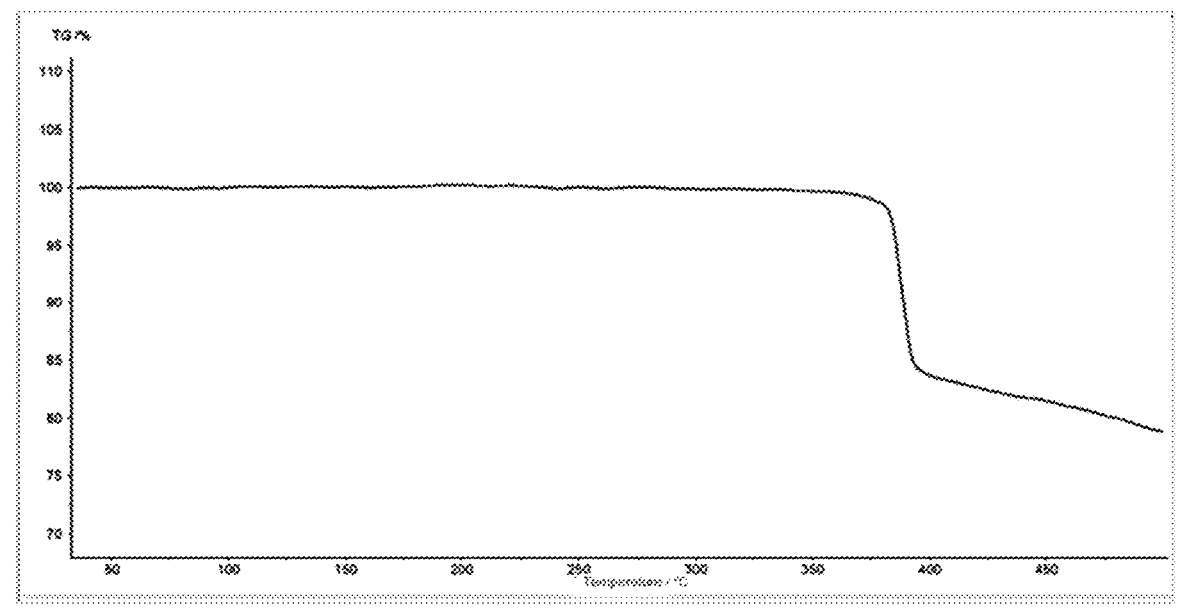
Figure 13:
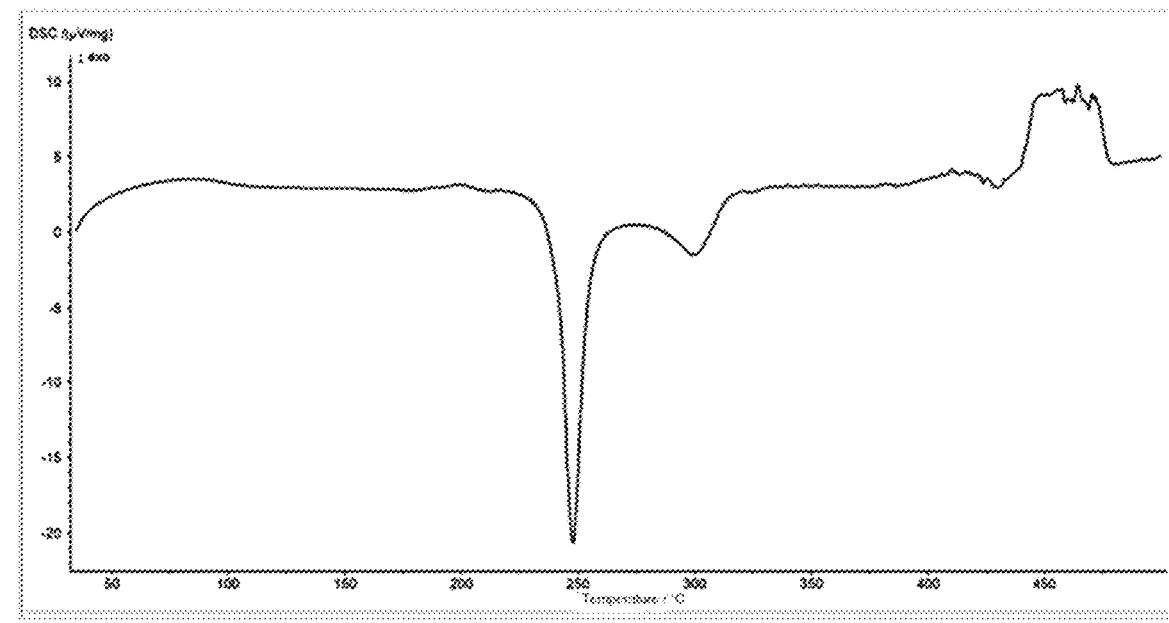
Figure 14:
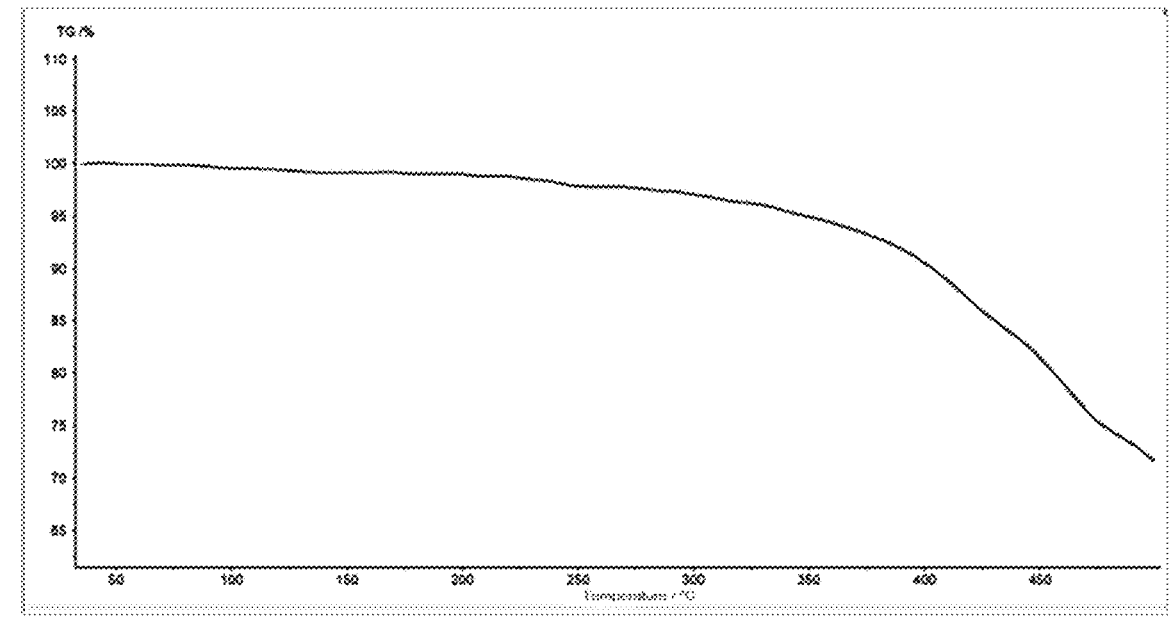

*butc = test specimen burned up to clamp
$^\#$dite = drips ignited cotton wool
⁻no second flame treatment possible because test specimen had already burned out after first ignition FIG. 10: thermogravimetric measurement of MOM-DOPO$_2$ FIG. 11: differential scanning calorimetric measurement of MOMP-H$_2$Zn FIG. 12: thermogravimetric measurement of MOMP-H$_2$Zn FIG. 13: differential scanning calorimetric measurement of PIMP FIG. 14: thermogravimetric measurement of PIMP

| Material | 1% weight loss | 2% weight loss | Residual mass at 500° C. |
|---|---|---|---|
| MOMP-H$_4$ | 251.7° C. | 276.9° C. | 64.29% |
| DAMP-H$_4$ | 244.5° C. | 273.1° C. | 71.41% |
| ATMP-H$_4$ | 176.4° C. | 193.9° C. | 72.43% |
| MOMP-Et$_4$ | 101.7° C. | 117.1° C. | 19.58% |
| MOM-DOPO$_2$ | 305.5° C. | 318.9° C. | 7.50% |
| MOMP-H$_2$Zn | 375.0° C. | 382.3° C. | 78.75% |
| PIMP-H$_4$ | 199.3 | 245.4 | 71.63% |

The invention claimed is:

1. A composition which comprises a polymer material and with a halogen-free flame retardant contained and/or bonded therein in a quantity of 1 to 40% by weight with respect to the total composition, wherein the flame retardant is a compound with formula (I), its corresponding ammonium salt, its corresponding phosphonate salt or a mixture of the above:

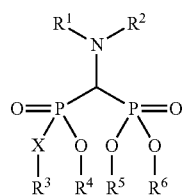

(I)

wherein (i) R$^1$ and R$^2$ are identical or different substituents and are selected from the group consisting of linear, branched or cyclic alkyls, alkenyls and alkinyls, unsubstituted and alkyl-substituted phenyls, mononuclear and multinuclear aromatics containing up to 4 nuclei, mononuclear or multinuclear heteroaromatics containing up to 4 nuclei, silyls, allyl, alkyl or aryl alcohols, or (ii) R$^1$ and R$^2$ together, including the N atom, form a saturated or monounsaturated or multiple-unsaturated heterocycle containing 4-8 ring atoms which are selected from carbon, oxygen, sulphur, phosphorus, silicon and nitrogen, wherein on the heterocycle, when it comprises nitrogen atoms as the ring atoms, these nitrogen atoms are substituted with H, an alkyl, an aryl or a methyl bisphosphonate group with the following structure (II):

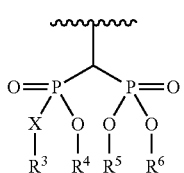

(II)

and wherein on the heterocycle, when it comprises carbon, phosphorus or silicon as the ring atoms, these atoms may have substituents selected from the group consisting of H, alkyl, aryl, —NH$_2$, —NHR, —NR$_2$, —OH, —OR, =O, —I, —Cl, —Br, in which R=alkyl, aryl, and wherein —X— is an oxygen atom, —O—, or —X— is a single bond, and wherein (i) R$^3$, R$^4$, R$^5$ and R$^6$ of the structures (II) and (III) are identical or different substituents and are selected from the group consisting of H, linear, branched or cyclic alkyls, alkenyls and alkinyls, unsubstituted and alkyl-substituted phenyls, multinuclear aromatics containing up to 4 nuclei, mononuclear or multinuclear heteroaromatics containing up to 4 nuclei, silyls, allyl, alkyl or aryl alcohols, cations, wherein the cation is Na$^+$, K$^+$, Mg$^{2+}$, Ca$^{2+}$, B$^{3+}$, Al$^{3+}$, Zn$^{2+}$, NH$_4^+$ or the ammonium ion of an amine com-pound selected from the group consisting of melamine or its condensation products, wherein (ia) when R$^1$ and R$^2$ are equal to methyl, R$^3$, R$^4$, R$^5$ and R$^6$ of structures (I) and (II) are identical or different substituents and are selected from the group consisting of linear, branched or cyclic alkyls, alkenyls and alkinyls, unsubstituted and alkyl-substituted phenyls, multinuclear aromatics containing up to 4 nuclei, mononuclear or multinuclear heteroaromatics containing up to 4 nuclei, silyls, allyl, alkyl or aryl alcohols, cations, wherein the cation is Mg$^{2+}$, Ca$^{2+}$, B$^{3+}$, Al$^{3+}$, Zn$^{2+}$, or the ammonium ion of an amine compound selected from the group consisting of melamine or its condensation products, and/or (ii) when —X— is an oxygen atom, —O—, —OR$^3$ and —OR$^4$ together and/or —OR$^5$ and —OR$^6$ together, including the P atom of the phosphonate group, form a cyclic phosphonic acid ester with a ring size of 4-10 atoms, and/or (iii) when —X— is a single bond, R$^3$ and —OR$^4$ together, including the P atom of the phosphinate group, form a cyclic phosphinic acid ester with a ring size of 4-10 atoms and/or —OR$^5$ and —OR$^6$ together, including the P atom of the phosphonate group, form a cyclic phosphonic acid ester with a ring size of 4-10 atoms, wherein, when the composition comprises the polymer material with the halogen-free flame retardant bonded therein, the halogen-free flame retardant is a co-condensation component or a co-addition component of the polymer material, which is used in the production of the polymer material by polycondensation or polyaddition.

2. The composition according to claim 1, wherein R$^1$ and R$^2$ together, including the N atom, form a morpholine or piperidine ring.

3. The composition according to claim 1, wherein R$^1$ and R$^2$ are identical or different substituents, wherein at least one of the substituents is melamine, wherein the nitrogen atoms of the amino groups are substituted with H, an alkyl, an aryl or a methyl bisphosphonate group with the following structure (II):

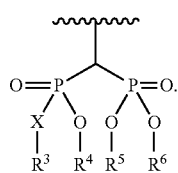

(II)

4. The composition according to claim 1, wherein the flame retardant is dry and reaches a loss of mass of 10% by weight above a temperature of 320° C., whereby dry means that the water content of the flame retardant is less than 0.5% by weight.

5. The composition according to claim 1, wherein the phosphorus content of the flame retardant is at least 19.5% by weight.

6. The composition according to claim 1, wherein at least one of the groups $R^3$, $R^4$, $R^5$ and $R^6$ of structures (I) and (II) are a cation or H, wherein the cation is $Na^+$, $K^+$, $Mg^{2+}$, $Ca^{2+}$, $B^{3+}$, $Al^{3+}$, $Zn^{2+}$, $NH_4^+$ or the ammonium ion of an amine compound selected from the group consisting of melamine or its condensation products.

7. The composition according to claim 1, wherein at least one of the groups $R^3$, $R^4$, $R^5$ and $R^6$ of structures (I) and (II) is an organic group, wherein each of said organic groups contains more than three carbon atoms.

8. The composition according to claim 1, wherein the polymer material is a thermoplastic selected from the group consisting of polyvinylbutyral (PVB), polypropylene (PP), polyethylene (PE), polyamide (PA), polyesters, polyurethane (PU), polyurea, polyphenylene oxide, polyacetal, polyacrylate, polymethacrylate, polyoxymethylene, polyvinyl acetal, polystyrene, acrylonitrile-butadiene-styrene (ABS), acrylonitrile-styrene-acrylic ester (ASA), polyethersulphone, polysulphonate, polytetrafluoroethylene, formaldehyde resins, melamine resins, polyetherketone, polyvinyl chloride, polylactide, polysiloxane, phenol resins, epoxy resins, poly(imide), bismaleimide-triazine, thermoplastic polyurethane, ethylene-vinyl acetate copolymer (EVA), copolymers and/or mixtures of the aforementioned polymers.

9. The composition according to claim 1, wherein the polymer material contains the flame retardant in a quantity of at least 3% by weight and/or in a quantity of at most 35% by weight, with respect to the total composition.

10. The composition according to claim 1, wherein the composition comprises at least one further flame retarding component.

11. The composition according to claim 1, wherein the composition comprises at least one filler which is selected from calcium carbonate, silicates calcium and barium sulphate, aluminium hydroxide, glass fibres and glass spheres, as well as wood flour, cellulose powder and activated charcoal and graphites.

12. The composition according to claim 1, wherein the composition comprises the polymer material in a quantity of at least 50% by weight.

13. A method for the production of the composition according to claim 1, wherein the flame retardant is a co-condensation component or co-addition component of the polymer material which is introduced into the polymer material by polycondensation or polyaddition.

14. A method comprising adding a compound with formula (I), its corresponding ammonia salt, its corresponding phosphonate salt or a mixture of the aforementioned, as a flame retardant to a polymer material to provide flame retarding properties:

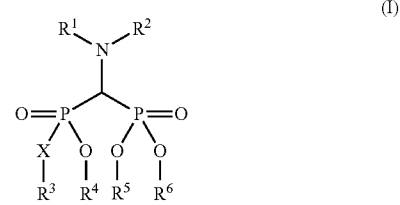

wherein
(i) $R^1$ and $R^2$ are identical or different substituents and are selected from the group consisting of linear, branched or cyclic alkyls, alkenyls and alkinyls, unsubstituted and alkyl-substituted phenyls, mononuclear and multinuclear aromatics containing up to 4 nuclei, mononuclear or multinuclear heteroaromatics containing up to 4 nuclei, silyls, allyl, alkyl or aryl alcohols, or (ii) $R^1$ and $R^2$ together, including the N atom, form a saturated or monounsaturated or multiple-unsaturated heterocycle containing 4-8 ring atoms which are selected from carbon, oxygen, sulphur, phosphorus, silicon and nitrogen, wherein on the hetero-cycle, when it comprises nitrogen atoms as the ring atoms, these nitrogen atoms are substituted with H, an alkyl, an aryl or a methyl bisphosphonate group with the following structure (II):

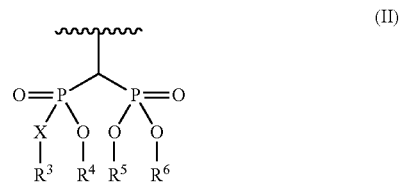

and wherein on the heterocycle, when it comprises carbon, phosphorus or silicon as the ring atoms, these atoms may have substituents selected from the group consisting of H, alkyl, aryl, —$NH_2$, —NHR, —$NR_2$, —OH, —OR, =O, —I, —Cl, —Br, in which R=alkyl, aryl, and wherein —X— is an oxygen atom, —O—, or —X— is a single bond, and wherein (i) $R^3$, $R^4$, $R^5$ and $R^6$ of structures (I) and (II) are identical or different substituents and are selected from the group consisting of H, linear, branched or cyclic alkyls, alkenyls and alkinyls, unsubstituted and alkyl-substituted phenyls, multinuclear aromatics containing up to 4 nuclei, mononuclear or multinuclear heteroaromatics containing up to 4 nuclei, silyls, allyl, alkyl or aryl alcohols, cations, wherein the cation is $Na^+$, $K^+$, $Mg^{2+}$, $Ca^{2+}$, $B^{3+}$, $Al^{3+}$, $Zn^{2+}$, $NH_4^+$ or the ammonium ion of an amine compound selected from the group consisting of melamine or its condensation products, and/or (ii) when —X— is an oxygen atom, —O—, —$OR^3$ and —$OR^4$ together and/or —OR— and —$OR^6$ together, including the P atom of the phosphonate group, form a cyclic phosphonic acid ester with a ring size of 4-10 atoms, and/or (iii) when —X— is a single bond, $R^3$ and —$OR^4$ together, including the P atom of the phosphinate group, form a cyclic phosphinic acid ester with a ring size of 4-10 atoms and/or —$OR^5$ and —$OR^6$ together, including the P atom of the phosphonate group, form a cyclic phosphonic acid ester with a ring size of 4-10 atoms.

* * * * *